(12) United States Patent
Liu et al.

(10) Patent No.: US 12,260,525 B2
(45) Date of Patent: Mar. 25, 2025

(54) IMAGE PROCESSING METHODS FOR IMPROVING DEFINITION OF IMAGE, ELECTRONIC DEVICES, AND NON-TRANSITORY COMPUTER-READABLE STORAGE MEDIA

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiaolei Liu, Beijing (CN); Jiankang Sun, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 358 days.

(21) Appl. No.: 17/793,487

(22) PCT Filed: Jun. 16, 2021

(86) PCT No.: PCT/CN2021/100328
§ 371 (c)(1),
(2) Date: Jul. 18, 2022

(87) PCT Pub. No.: WO2021/254381
PCT Pub. Date: Dec. 23, 2021

(65) Prior Publication Data
US 2023/0082346 A1   Mar. 16, 2023

(30) Foreign Application Priority Data

Jun. 17, 2020   (CN) .......................... 202010553063.5

(51) Int. Cl.
*G06T 5/70* (2024.01)
*G06T 3/4007* (2024.01)
(Continued)

(52) U.S. Cl.
CPC .............. *G06T 5/70* (2024.01); *G06T 3/4007* (2013.01); *G06T 3/403* (2013.01); *G06T 7/13* (2017.01); *G06T 2207/20192* (2013.01)

(58) Field of Classification Search
None
See application file for complete search history.

(56) References Cited

U.S. PATENT DOCUMENTS

| 2015/0248000 | A1* | 9/2015 | Hayashi ................... H04N 7/01 348/80 |
| 2017/0053380 | A1* | 2/2017 | McNally ................... G06T 7/60 |

\* cited by examiner

*Primary Examiner* — Lennin R Rodriguezgonzalez
(74) *Attorney, Agent, or Firm* — XSENSUS LLP

(57) ABSTRACT

An image processing method includes: according to position coordinates of any interpolation pixel in a target image, determining position coordinate of the interpolation pixel in an original image; calculating a two-dimensional image entropy of an (n×n) neighborhood of the interpolation pixel in the original image; when it is greater than or equal to a preset entropy threshold value, calculating a pixel value of the interpolation pixel based on all original pixels; when it is less than the preset entropy threshold, calculating gradient values in at least two edge directions within the threshold neighborhood and determining whether there is a strong-edge direction; if so, calculating the pixel value of the interpolation pixel based on a plurality of original pixels in the strong-edge direction; if not, calculating the pixel value of the interpolation pixel based on all the original pixels.

20 Claims, 14 Drawing Sheets

(51) Int. Cl.
*G06T 3/403* (2024.01)
*G06T 7/13* (2017.01)

IMAGE PROCESSING METHODS FOR IMPROVING DEFINITION OF IMAGE, ELECTRONIC DEVICES, AND NON-TRANSITORY COMPUTER-READABLE STORAGE MEDIA

CROSS-REFERENCE TO RELATED APPLICATIONS

The application is a national phase entry under 35 USC 371 of International Patent Application No. PCT/CN2021/100328, filed on Jun. 16, 2021, which claims priority to Chinese Patent Application No. 202010553063.5, filed on Jun. 17, 2020, which are incorporated herein by reference in their entirety.

TECHNICAL FIELD

The present disclosure relates to the field of image processing technologies, and in particular, to image processing methods, electronic devices, and non-transitory computer-readable storage media.

BACKGROUND

With the development of image processing technologies, image resolution enhancement has become an important research direction. Existing image resolution enhancement methods are generally implemented based on image interpolation algorithms. Each interpolation pixel is processed by a same processing method, resulting in low definition and poor quality of the processed image, and it is impossible to achieve resolution enhancement of any scale for an original image.

SUMMARY

In an aspect, an image processing method is provided. The image processing method includes:
determining, according to position coordinates, in a target image, of any interpolation pixel to be processed of the target image, position coordinates of the interpolation pixel in an original image; the target image being an image after the original image is performed a resolution enhancement, and the interpolation pixel being a pixel generated during the resolution enhancement;
calculating a two-dimensional image entropy of an (n×n) neighborhood of the interpolation pixel in the original image according to the position coordinates of the interpolation pixel in the original image; n being greater than or equal to 2 (n≥2) and n being a positive integer;
in a case where the two-dimensional image entropy is greater than or equal to a preset entropy threshold value, calculating a pixel value of the interpolation pixel through a first interpolation algorithm based on all original pixels within the (n×n) neighborhood;
in a case where the two-dimensional image entropy is less than the preset entropy threshold value, calculating gradient values in at least two edge directions within the (n×n) neighborhood, and determining whether there is a strong-edge direction in the at least two edge directions according to the gradient values in the at least two edge directions; if there is the strong-edge direction, calculating the pixel value of the interpolation pixel through the first interpolation algorithm based on a plurality of original pixels in the strong-edge direction within the (n×n) neighborhood; and if there is no strong-edge direction, calculating the pixel value of the interpolation pixel through a second interpolation algorithm based on all the original pixels within the (n×n) neighborhood.

In some embodiments, calculating the gradient values in the at least two edge directions within the (n×n) neighborhood includes: obtaining gray-scale values of a plurality of original pixels in a selected range of each edge direction within the (n×n) neighborhood; calculating an absolute value of a difference between gray-scale values of every two adjacent original pixels in the selected range of each edge direction; taking a sum or a mean of absolute values of differences between gray-scale values of all two adjacent original pixels in the selected range of each edge direction as a gradient value in the edge direction.

In some embodiments, the at least two edge directions include a first edge direction, a second edge direction, a third edge direction and a fourth edge direction. Calculating the gradient values in the at least two edge directions within the (n×n) neighborhood includes: taking a sum or a mean of absolute values of differences between gray-scale values of all two adjacent original pixels in a selected range of the first edge direction as a gradient value in the first edge direction; taking a sum or a mean of absolute values of differences between gray-scale values of all two adjacent original pixels in a selected range of the second edge direction as a gradient value in the second edge direction; taking a sum or a mean of absolute values of differences between gray-scale values of all two adjacent original pixels in a selected range of the third edge direction as a gradient value in the third edge direction; and taking a sum or a mean of absolute values of differences between gray-scale values of all two adjacent original pixels in a selected range of the fourth edge direction as a gradient value in the fourth edge direction.

In some embodiments, determining whether there is the strong-edge direction in the at least two edge directions according to the gradient values in the at least two edge directions includes: determining a ratio $\alpha_1$ of a larger value to a smaller value between the gradient value in the first edge direction and the gradient value in the second edge direction, a ratio $\alpha_2$ of a larger value to a smaller value between the gradient value in the third edge direction and the gradient value in the fourth edge direction, and a preset ratio threshold value T; in a case where $\alpha_1$ is greater than $\alpha_2$, and $\alpha_2$ is greater than T ($\alpha_1 > \alpha_2 > T$), determining that there is the strong-edge direction, and determining an edge direction with a larger gradient value between the gradient value in the first edge direction and the gradient value in the second edge direction as the strong-edge direction; in a case where $\alpha_2$ is greater than $\alpha_1$, and $\alpha_1$ is greater than T ($\alpha_2 > \alpha_1 > T$), determining that there is the strong-edge direction, and determining an edge direction with a larger gradient value between the gradient value in the third edge direction and the gradient value in the fourth edge direction as the strong-edge direction; and in a case where $\alpha_1$ is less than or equal to T ($\alpha_1 \leq T$), and/or $\alpha_2$ is less than or equal to T ($\alpha_2 \leq T$), determining that there is no strong-edge direction.

In some embodiments, the at least two edge directions include a first edge direction and a second edge direction. Determining whether there is the strong-edge direction in the at least two edge directions according to the gradient values in the at least two edge directions includes: determining a ratio $\alpha$ of a larger value to a smaller value between a gradient value in the first edge direction and a gradient value in the second edge direction, and a preset ratio threshold value T; in a case where a is greater than T ($\alpha > T$), determining that there is the strong-edge direction, and determining an edge direction with a larger gradient value between the gradient value in the first edge direction and the gradient value in the second edge direction as the strong-edge direction; and in a case where α is less than or equal to T (α<T), determining that there is no strong-edge direction.

In some embodiments, the at least two edge directions include a first edge direction, a second edge direction and a third edge direction. Determining whether there is the strong-edge direction in the at least two edge directions according to the gradient values in the at least two edge directions includes: determining a ratio $\alpha_3$ of a larger value to a smaller value between a gradient value in the first edge direction and a gradient value in the second edge direction, a ratio $\alpha_4$ of a larger value to a smaller value between the gradient value in the second edge direction and a gradient value in the third edge direction, and a preset ratio threshold value T; in a case where $\alpha_3$ is greater than $\alpha_4$, and $\alpha_4$ is greater than T ($\alpha_3 > \alpha_4 > T$), determining that there is the strong-edge direction, and determining an edge direction with a larger gradient value between the gradient value in the first edge direction and the gradient value in the second edge direction as the strong-edge direction; in a case where $\alpha_4$ is greater than $\alpha_3$, and $\alpha_3$ is greater than T ($\alpha_4 > \alpha_3 > T$), determining that there is the strong-edge direction, and determining an edge direction with a larger gradient value between the gradient value in the second edge direction and the gradient value in the third edge direction as the strong-edge direction; and in a case where $\alpha_3$ is less than or equal to T ($\alpha_3 \leq T$), and/or $\alpha_4$ is less than or equal to T ($\alpha_4 \leq T$), determining that there is no strong-edge direction.

In some embodiments, in a case where a sum of absolute values of differences between gray-scale values of all two adjacent original pixels in a selected range of an edge direction is taken as a gradient value in the edge direction, in a process of determining a ratio of a larger value to a smaller value between two gradient values, in respective edge directions corresponding to the two gradient values, numbers of original pixels each for calculating a gradient value included in a selected range are equal to each other.

In some embodiments, the preset ratio threshold value is in a range of 1.2 to 1.3, inclusive.

In some embodiments, the at least two edge directions include a first edge direction and a second edge direction, and the first edge direction is substantially perpendicular to the second edge direction.

In some embodiments, the at least two edge directions further include a third edge direction and a fourth edge direction, the third edge direction is substantially perpendicular to the fourth edge direction, and an included angle between the first edge direction and the third edge direction is approximately 45°.

In some embodiments, the first edge direction is substantially parallel to one of two diagonals of a rectangle determined by the (n×n) neighborhood, the second edge direction is substantially parallel to another one of the two diagonals of the rectangle determined by the (n×n) neighborhood, the third edge direction is substantially parallel to a row direction in which a plurality of pixels in the (n×n) neighborhood are arranged, and the fourth edge direction is substantially parallel to a column direction in which the plurality of pixels in the (n×n) neighborhood are arranged.

In some embodiments, the preset entropy threshold value is in a range of 0.3 to 0.8, inclusive.

In some embodiments, the (n×n) neighborhood is a (4×4) neighborhood.

In some embodiments, the first interpolation algorithm is a bicubic convolution interpolation algorithm, and/or the second interpolation algorithm is a B-spline interpolation algorithm.

In another aspect, an image processing method is provided. The image processing method includes:
  determining, according to position coordinates, in a target image, of any interpolation pixel to be processed of the target image, position coordinates of the interpolation pixel in an original image; the target image being an image after the original image is performed a resolution enhancement, and the interpolation pixel being a pixel generated during the resolution enhancement;
  calculating gradient values in at least two edge directions within an (n×n) neighborhood of the interpolation pixel in the original image according to the position coordinate of the interpolation pixel in the original image, and determining whether there is a strong-edge direction in the at least two edge directions according to the gradient values in the at least two edge directions, n being greater than or equal to 2 (n≥2) and n being a positive integer; if there is the strong-edge direction, calculating a pixel value of the interpolation pixel through a first interpolation algorithm based on a plurality of original pixels in the strong-edge direction within the (n×n) neighborhood; if there is no strong-edge direction, calculating a two-dimensional image entropy of the (n×n) neighborhood of the interpolation pixel;
  in a case where the two-dimensional image entropy is greater than or equal to a preset entropy threshold value, calculating the pixel value of the interpolation pixel through the first interpolation algorithm based on all original pixels within the (n×n) neighborhood; and
  in a case where the two-dimensional image entropy is less than the preset entropy threshold value, calculating the pixel value of the interpolation pixel through a second interpolation algorithm based on all the original pixels within the (n×n) neighborhood.

In yet another aspect, an electronic device is provided. The electronic device includes a processor and a memory. The memory stores computer program instructions adapted to be executed by the processor. When run on the processor, the computer program instructions cause the processor to execute the image processing method as described in any of the above embodiments.

In yet another aspect, a non-transitory computer-readable storage medium is provided. The computer-readable storage medium has stored therein computer program instructions that, when run on a computer, cause the computer to execute the image processing method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
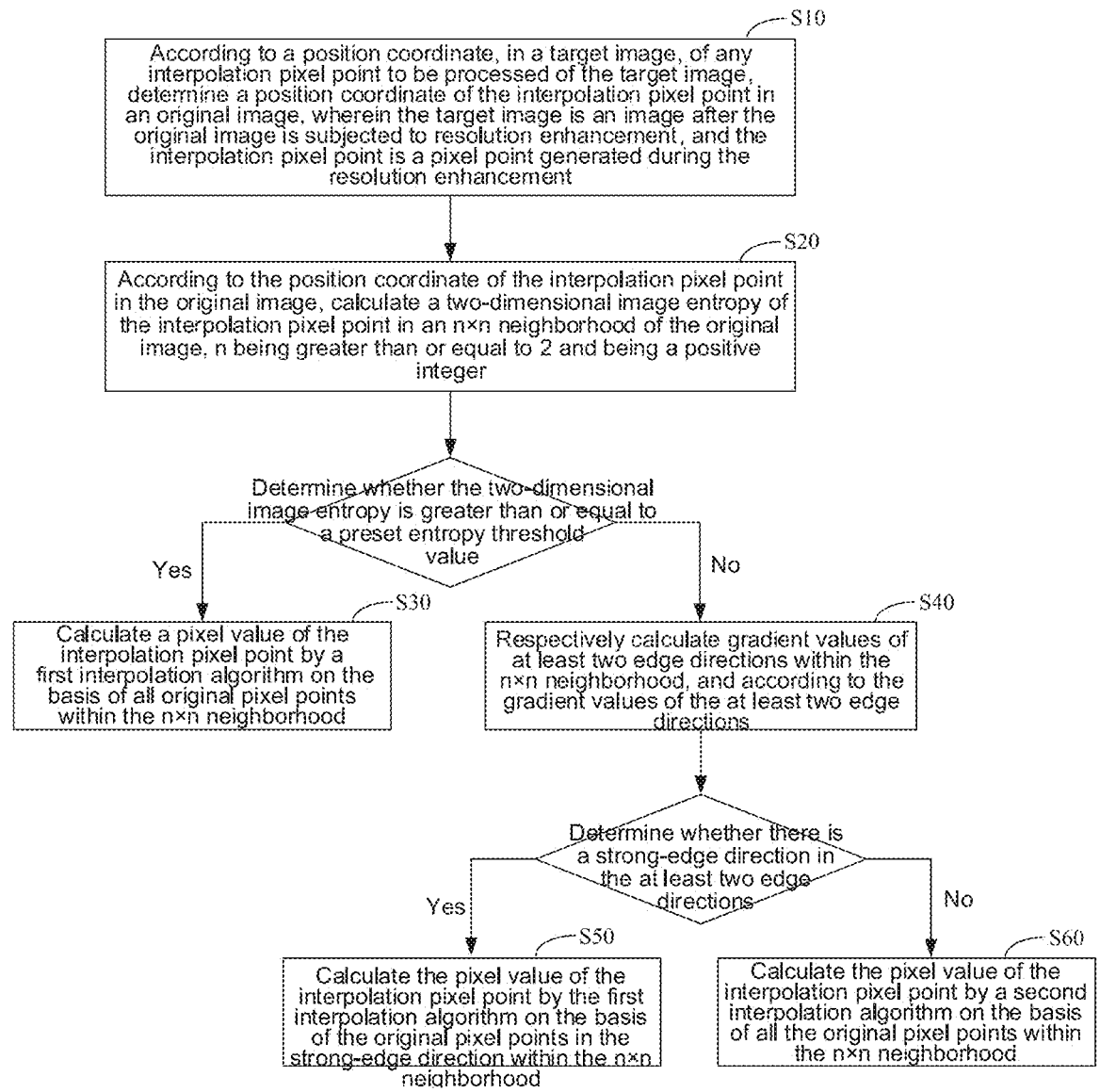
FIG. 1 is a flow diagram of an image processing method, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, features defined with "first" and "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or value exceeding those stated.

As shown in FIG. 1, some embodiments of the present disclosure provide an image processing method. The image processing method is used for achieving image resolution enhancement. The method includes steps S10 to S60.

In S10, according to position coordinates, in a target image, of any interpolation pixel to be processed, position coordinates of the interpolation pixel in an original image are determined. The target image is an image after the original image is performed a resolution enhancement, and the interpolation pixel is a pixel generated during the resolution enhancement.

For example, the position coordinates of the interpolation pixel in the original image may be determined through coordinate mapping.

For example, a width direction of the original image is taken as an X-axis direction, a height direction of the original image is taken as a Y-axis direction, and an original pixel in the original image is taken as an origin. For example, the original pixel at the bottom leftmost of the original image is taken as the origin.

The position coordinates of the interpolation pixel in the target image are (u, v), and the position coordinates (u, v) of the interpolation pixel in the target image are mapped into the original image according to the following mapping formulas.

The mapping formula in the X-direction (the width direction of the image) is:

$$fx=(\text{float})((u+0.5)\times\text{inv\_scale\_}x-0.5);$$

$$x=\text{floor}(x).$$

The mapping formula in the Y-direction (the height direction of the image) is:

$$fy=(\text{float})((v+0.5)\times\text{inv\_scale\_}y-0.5);$$

$$y=\text{floor}(fy).$$

Where (float) means to take floating-point data, inv_scale_x means a ratio of the target image to the original image in the X-axis direction, inv_scale_y means a ratio of the target image to the original image in the Y-axis direction, floor(fx) means rounding down fx, floor(fy) means rounding down fy, and (x, y) is the position coordinates of the interpolation pixel in the original image.

In this way, the resolution of the original image may be enhanced in any scale through the above mapping formulas.

In S20, a two-dimensional image entropy of an (n×n) neighborhood of the interpolation pixel in the original image is calculated according to the position coordinates of the interpolation pixel in the original image, n is greater than or equal to 2 (n≥2) and n is a positive integer.

The (n×n) neighborhood is a set region around the position coordinates (x, y) of the interpolation pixel in the original image. The set region includes (n×n) original pixels, and n is greater than and or equal to 2 (n≥2) and n is a positive integer. For example, the set region may include (2×2) original pixels, (3×3) original pixels, (4×4) original pixels, which is not limited thereto in the embodiments of the present disclosure.

Figure 7:
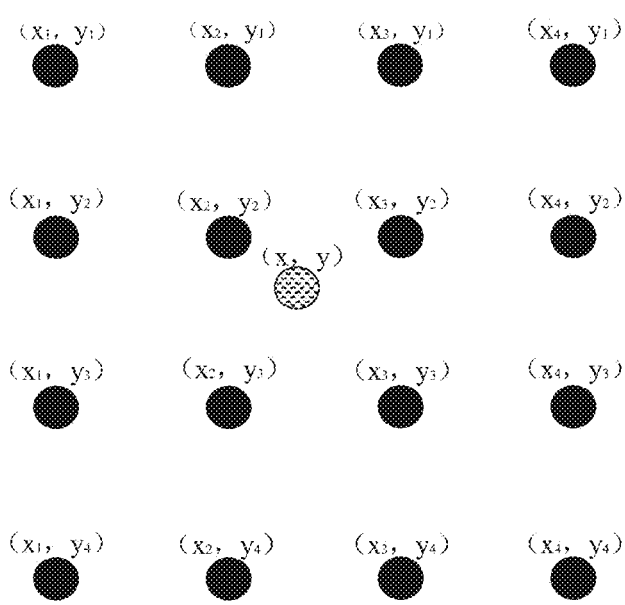
FIG. 7 is a schematic diagram of an interpolation pixel and pixels in a (4×4) neighborhood thereof in an image processing method, in accordance with some embodiments.

In some embodiments, as shown in FIG. 7, the (n×n) neighborhood 100 is a (4×4) neighborhood, the position coordinates of the interpolation pixel 02 in the original image 10 shown in FIG. 7 is (x, y). Position coordinates of 16 original pixels $\alpha_1$ in the (4×4) neighborhood are: $(x_1, y_1)$, $(x_1, y_2)$, $(x_1, y_3)$, $(x_1, y_4)$, $(x_2, y_1)$, $(x_2, y_2)$, $(x_2, y_3)$, $(x_2, y_4)$, $(x_3, y_1)$, $(x_3, y_2)$, $(x_3, y_3)$, $(x_3, y_4)$, $(x_4, y_1)$, $(x_4, y_2)$, $(x_4, y_3)$ and $(x_4, y_4)$.

In this case, for example, the method of calculating the two-dimensional image entropy of the (4×4) neighborhood of the interpolation pixel in the original image is:

compressing gray-scale values of 16 original pixels in the (4×4) neighborhood into 8 gray-scale levels, counting an (8×8) gray-scale co-occurrence matrix of the 16 original pixels, and obtaining the two-dimensional image entropy of the (4×4) neighborhood through calculation according to an expression of the (8×8) gray-scale co-occurrence matrix.

It is determined whether the two-dimensional image entropy is greater than or equal to a preset entropy threshold value. In a case where the two-dimensional image entropy is greater than or equal to the preset entropy threshold value, a texture type of the (n×n) neighborhood is a complex texture as shown in the portion 8C of FIG. 8. In a case where the two-dimensional image entropy is less than the preset entropy threshold value, the texture type of the (n×n) neighborhood may be an edge texture as shown in the portion 8A of FIG. 8, or a smooth texture as shown in the portion 8B of FIG. 8.

Figure 8:
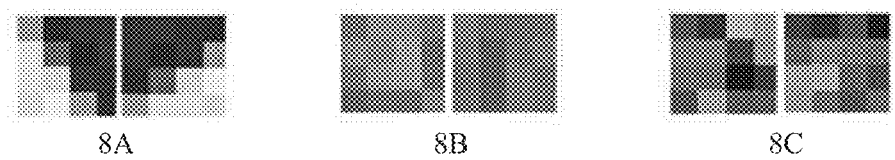
FIG. 8 is a schematic diagram of different types of texture, in accordance with some embodiments of the present disclosure.

Therefore, in combination with the two-dimensional image entropy and the preset entropy threshold value, in the case where the two-dimensional image entropy is greater than or equal to the preset entropy threshold value, that is, when it is determined that the texture type of the (n×n) neighborhood is the complex texture as shown in the portion 8C of FIG. 8, the step S30 is performed; and in the case where the two-dimensional image entropy is less than the preset entropy threshold value, that is, when it is determined that the texture type of the (n×n) neighborhood is the edge texture as shown in the portion 8A of FIG. 8 or the smooth texture as shown in the portion 8B of FIG. 8, the step S40 is performed.

In some embodiments, the preset entropy threshold value is in a range of 0.3 to 0.8, inclusive. For example, the preset entropy threshold value is 0.3, 0.4, 0.5, 0.6, 0.7, or 0.8.

In S30, a pixel value of the interpolation pixel is calculated through a first interpolation algorithm based on all original pixels within the (n×n) neighborhood.

In some embodiments, the first interpolation algorithm is a bicubic convolution interpolation algorithm. The bicubic convolution interpolation algorithm may assign different weight values to the original pixels according to distances between the original pixels and the interpolation pixel, perform a weighted operation on the original pixels according to the weight values of the different original pixels, and take a result of the weighted operation as the pixel value of the interpolation pixel. Therefore, it is possible to remove aliasing on the target image to a certain degree, thus the target image after the resolution enhancement may be of good quality.

The bicubic convolution interpolation algorithm adopts the following a piecewise convolution kernel function to perform the convolution calculation.

$$u(s) = \begin{cases} (a+2)|s|^3 - (a+3)|s|^2 + 1 & 0 \le |s| < 1; \\ a|s|^3 - 5a|s|^2 + 8a|s| - 4a & 1 \le |s| < 2; \\ 0 & 2 \le |s| \end{cases}$$

Where a is a distance between two adjacent original pixels, s is a distance between an original pixel and the interpolation pixel, and u(s) is the pixel value of the interpolation pixel.

For example, in a case where the two-dimensional image entropy H of the (4×4) neighborhood is obtained through calculation and it is determined that the two-dimensional image entropy H of the (4×4) neighborhood is greater than or equal to 0.6, the pixel value of the interpolation pixel is calculated through the bicubic convolution interpolation algorithm based on all the original pixels within the (4×4) neighborhood.

It will be noted that, in the case where it is determined that the two-dimensional image entropy H of the (4×4) neighborhood is greater than or equal to 0.6, in addition to the bicubic convolution interpolation algorithm, the pixel value of the interpolation pixel is calculated based on all the original pixels within the (4×4) neighborhood through another interpolation algorithm, such as a nearest neighbor interpolation algorithm or a bilinear interpolation algorithm.

In the case where the two-dimensional image entropy is less than the preset entropy threshold value, in order to determine whether the texture type of the (n×n) neighborhood is the edge texture shown in the portion 8A of FIG. 8 or the smooth texture shown in the portion 8B of FIG. 8, the steps S40 to S60 are performed.

In S40, gradient values in at least two edge directions within the (n×n) neighborhood are calculated.

Here, the at least two edge directions may include two edge directions, three edge directions or four edge directions, which is not limited thereto. It will be understood that, the greater the number of edge directions included in the at least two edge directions, the better the definition of the processed image.

After obtaining the gradient value in each edge direction, it is determined whether there is a strong-edge direction in the at least two edge directions. If there is the strong-edge direction in the at least two edge directions, the step S50 is performed; if there is no strong-edge direction in the at least two edge directions, the step S60 is performed.

In S50, the pixel value of the interpolation pixel is calculated through the first interpolation algorithm based on original pixels in the strong-edge direction within the (n×n) neighborhood.

In some embodiments, the first interpolation algorithm is the bicubic convolution interpolation algorithm. The calculation formula and beneficial effects of the bicubic convolution interpolation algorithm are the same as those described above, which will not be repeated here.

In S60, the pixel value of the interpolation pixel is calculated through a second interpolation algorithm based on all the original pixels within the (n×n) neighborhood.

In some embodiments, the second interpolation algorithm is a B-spline interpolation algorithm. A spline curve of the B-spline interpolation algorithm has advantages of being differentiable at nodes and being of smoothness.

Figure 2:
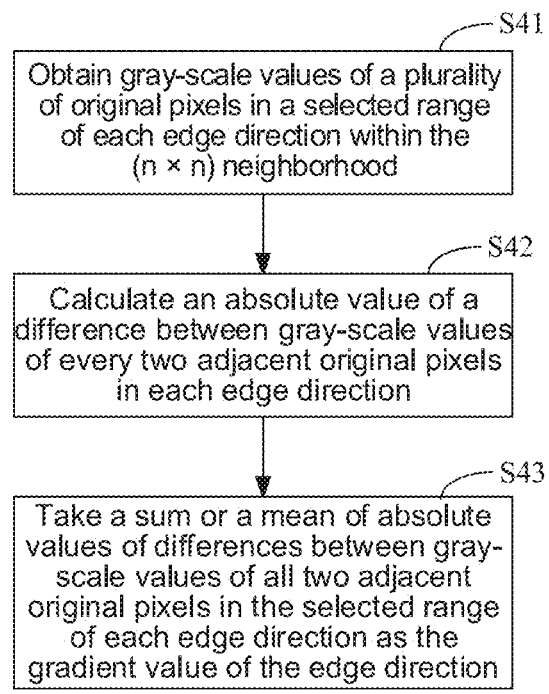
FIG. 2 is a flow diagram of another image processing method, in accordance with some embodiments.

In some embodiments, as shown in FIG. 2, S40 includes steps S41 to S43.

In S41, gray-scale values of a plurality of original pixels in a selected range of each edge direction within the (n×n) neighborhood are obtained.

Figure 10:
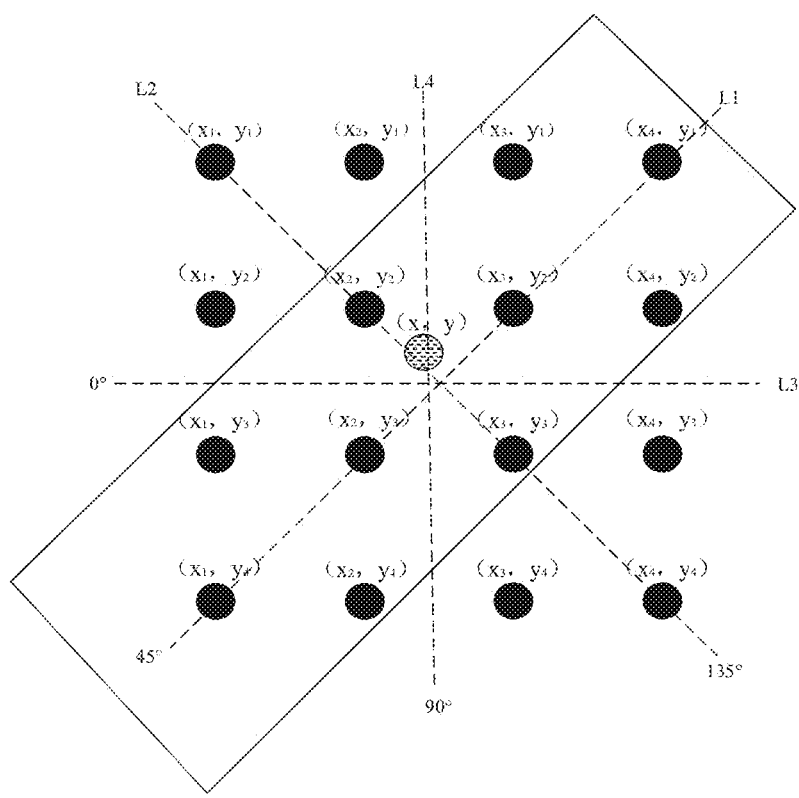
FIG. 10 is a schematic diagram of original pixels within a selected range in a first edge direction in an image processing method, in accordance with some embodiments.

The selected range of each edge direction within the (n×n) neighborhood may be preset, and the selected range of each edge direction may include a plurality of groups of original pixels distributed in the edge direction. For example, as shown in FIG. 10, within the (4×4) neighborhood and in a selected range of an edge direction at an angle of 45° to the width direction of the picture, there are three groups of original pixels distributed in the edge direction. Two groups therein respectively include three original pixels distributed in the edge direction, and the remaining one group therein includes 4 original pixels distributed in the edge direction.

In addition, a shape of the selected range is not limited, for example, it may be a rectangle, or a circle.

In S42, an absolute value of a difference between gray-scale values of every two adjacent original pixels in the selected range of each edge direction is calculated.

In S43, a sum or a mean of absolute values of differences between gray-scale values of all two adjacent original pixels in the selected range of each edge direction is taken as the gradient value in the edge direction.

As described above, the number of edge directions used to determine the texture type is not limited, for example, it may be two, three or four.

In some embodiments, four edge directions, which are a first edge direction L1, a second edge direction L2, a third edge direction L3 and a fourth edge direction L4, are used to determine the texture type.

Figure 9:
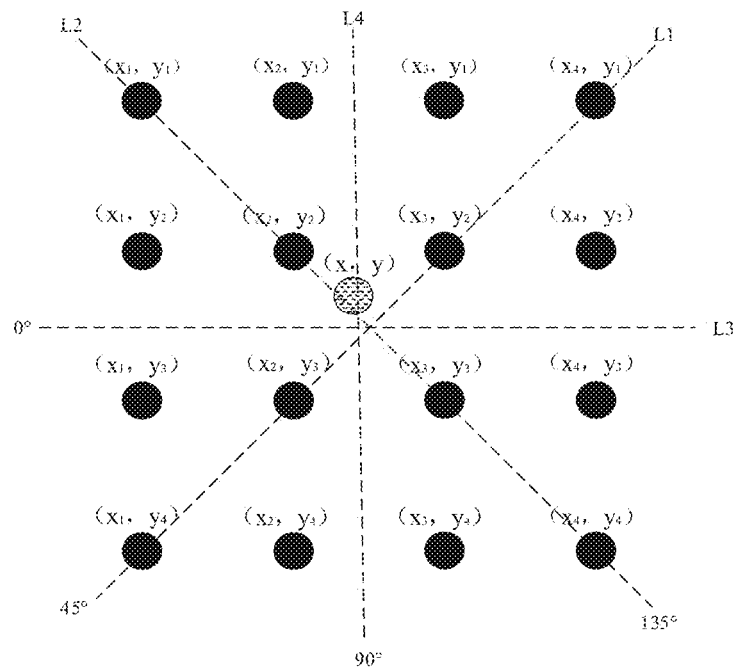
FIG. 9 is a schematic diagram of the schematic diagram in FIG. 7 marking a first edge direction, a second edge direction, a third edge direction and a fourth edge direction.

In some embodiments, as shown in FIG. 9, the first edge direction L1 is substantially perpendicular to the second edge direction L2. For example, the first edge direction L1 is substantially parallel to one of two diagonals of a rectangle determined by the (n×n) neighborhood, the second edge direction L2 is substantially parallel to the other of the two diagonals of the rectangle determined by the (n×n) neighborhood. The rectangle determined by the (n×n) neighborhood is a rectangle enclosed by line segments connecting the pixels on the outermost side within the (n×n) neighborhood.

For example, the first edge direction L1 is parallel to a line having an angle of 45° with the horizontal direction, and the second edge direction L2 is parallel to a line having an angle of 135° with the horizontal direction.

In some embodiments, as shown in FIG. 9, the third edge direction L3 is substantially perpendicular to the fourth edge direction L4, and an included angle between the first edge direction L1 and the third edge direction L3 is substantially 45°. For example, the third edge direction L3 is substantially parallel to a row direction of the plurality of pixels arranged within the (n×n) neighborhood, and the fourth edge direction L4 is substantially parallel to a column direction of the plurality of pixels arranged within the (n×n) neighborhood.

For example, the third edge direction L3 is parallel to a line having an angle of 0° with the horizontal direction, and the fourth edge direction L4 is parallel to a line having an angle of 90° with the horizontal direction.

It will be noted that, the first edge direction L1, the second edge direction L2, the third edge direction L3 and the fourth edge direction L4 may also be other directions. For example, the first edge direction L1 may be a direction of 30°, the second edge direction L2 may be a direction of 120°, the third edge direction L3 may be a direction of −15°, and the fourth edge direction L4 may be a direction of 75°.

Figure 3:
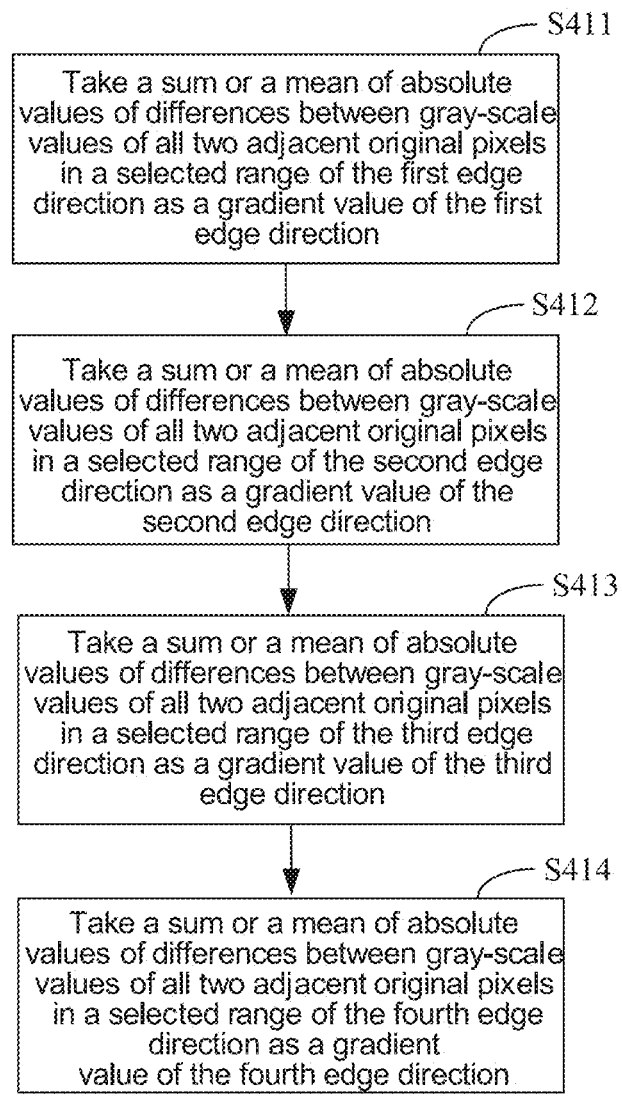
FIG. 3 is a flow diagram of yet another image processing method, in accordance with some embodiments.

In a case where the at least two edge directions include the first edge direction L1, the second edge direction L2, the third edge direction L3 and the fourth edge direction L4, as shown in FIG. 3, S40 includes steps S411 to S414.

In S411, a sum or a mean of absolute values of differences between gray-scale values of all two adjacent original pixels in a selected range of the first edge direction L1 is taken as a gradient value in the first edge direction L1.

For example, the first edge direction L1 is parallel to the line having the angle of 45° with the horizontal direction, the (n×n) neighborhood is the (4×4) neighborhood, and the selected range is a range of the rectangular box shown in FIG. 10. As shown in FIG. 10, considering an example in which the sum of the absolute values of the differences between the gray-scale values of all two adjacent original pixels in the rectangular box in the direction of 45° is the gradient value in the direction of 45°, the gradient value is obtained through the following formula:

$$G_{45°} = ||(x_1,y_4)-|(x_2,y_3)|+||(x_3,y_3)-|(x_3,y_2)|+||(x_3,y_2)-|(x_4,y_1)|+||(x_1,y_3)-|(x_2,y_2)|+||(x_2,y_2)-|(x_3,y_1)|+|(x_2,y_4)-|(x_3,y_3)|+|(x_3,y_3)|-|(x_3,y_3)-|(x_4,y_2)|.$$

Where $G_{45°}$ is the gradient value in the direction of 45°.

It will be noted that, in a case where the mean of the absolute values of the differences between the gray-scale values of all two adjacent original pixels in the selected range of the first edge direction L1 is taken as the gradient value in the first edge direction L1, it is necessary to, on a basis of obtaining the sum of the absolute values of the differences between the gray-scale values of all two adjacent original pixels in the selected range of the first edge direction L1, divide the sum of the absolute values by the number of the absolute values of the differences between the gray-scale values.

For example, in the case where the first edge direction L1 is parallel to the line having an angle of 45° with the horizontal direction, the (n×n) neighborhood is the (4×4) neighborhood, and the selected range is the range of the rectangular box shown in FIG. 10, if the mean of the absolute values of the differences between the gray-scale values of all two adjacent original pixels in the rectangular box in the direction of 45° is taken as the gradient value in the direction of 45°, the above $G_{45}°$ needs to be divided by 7.

In S412, a sum or a mean of absolute values of differences between gray-scale values of all two adjacent original pixels in a selected range of the second edge direction L2 is taken as a gradient value in the second edge direction L2.

Figure 11:
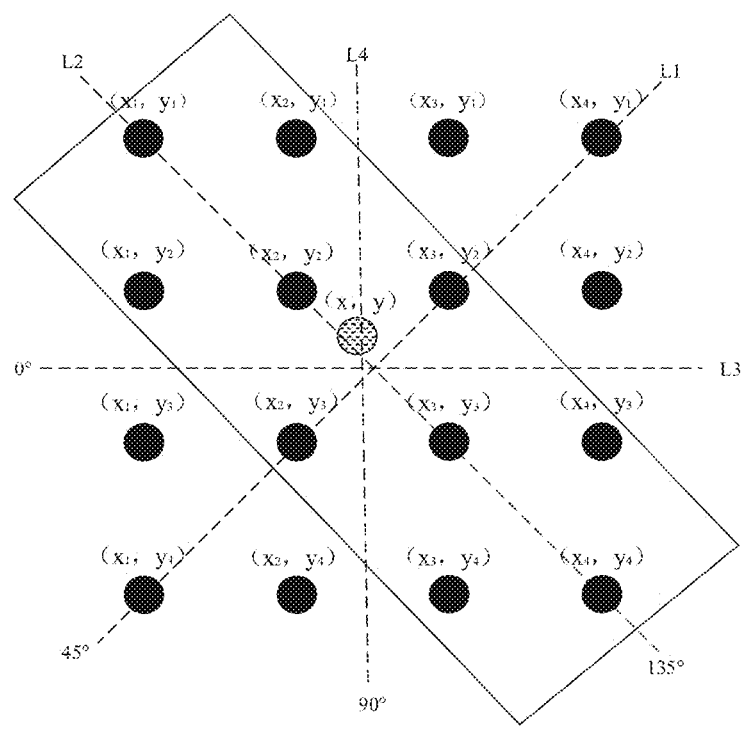
FIG. 11 is a schematic diagram of original pixels within a selected range in a second edge direction in an image processing method, in accordance with some embodiments.

For example, the second edge direction L2 is parallel to the line having an angle of 135° with the horizontal direction, the (n×n) neighborhood is the (4×4) neighborhood, and the selected range is a range of the rectangular box shown in FIG. 11. As shown in FIG. 11, considering an example in which the sum of the absolute values of the differences between the gray-scale values of all two adjacent original pixels in the rectangular box in the direction of 135° is the gradient value in the direction of 135° (i.e., $G_{135}°$), the gradient value is obtained through the following formula:

$$G_{135}°=||(x_1,y_1)-|(x_2,y_2)|+||(x_2,y_2)-|(x_3,y_3)|+||(x_3,y_3)-|(x_4,y_4)|+||(x_1,y_2)-|(x_2,y_3)|+||(x_2,y_3)-|(x_3,y_4)|+||(x_2,y_1)-|(x_3,y_2)|+||(x_3,y_2)-|(x_4,y_3)|.$$

It will be noted that, in a case where the mean of the absolute values of the differences between the gray-scale values of all two adjacent original pixels in the selected range of the second edge direction L2 is taken as the gradient value in the second edge direction L2, it is necessary to, on a basis of obtaining the sum of the absolute values of the differences between the gray-scale values of all two adjacent original pixels in the selected range of the second edge direction L2, divide the sum of the absolute values by the number of the absolute values of the differences between the gray-scale values.

For example, in the case where the second edge direction L2 is parallel to the line having an angle of 135° with the horizontal direction, the (n×n) neighborhood is the (4×4) neighborhood, and the selected range is the range of the rectangular box shown in FIG. 11, if the mean of the absolute values of the differences between the gray-scale values of all two adjacent original pixels in the rectangular box in the direction of 135° is taken as the gradient value in the direction of 135°, the above $G_{135}°$ needs to be divided by 7.

In S413, a sum or a mean of absolute values of differences between gray-scale values of all two adjacent original pixels in a selected range of the third edge direction L3 is taken as a gradient value in the third edge direction L3.

Figure 12:
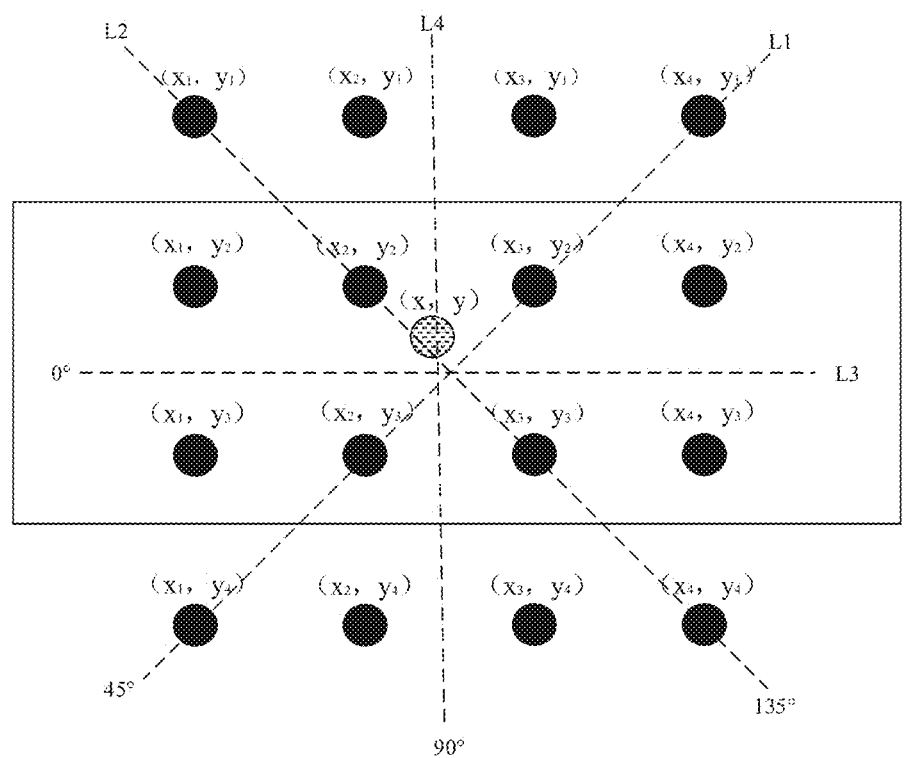
FIG. 12 is a schematic diagram of original pixels within a selected range in a third edge direction in an image processing method, in accordance with some embodiments.

For example, the third edge direction L3 is parallel to the line having an angle of 0° with the horizontal direction, the (n×n) neighborhood is the (4×4) neighborhood, and the selected range is a range of the rectangular box shown in FIG. 12. As shown in FIG. 12, considering an example in which the sum of the absolute values of the differences between the gray-scale values of all two adjacent original pixels in the rectangular box in the direction of 0° is the gradient value in the direction of 0° (i.e., $G_0°$), the gradient value is obtained through the following formula:

$$G_0°=||(x_1,y_2)-|(x_2,y_2)|+||(x_2,y_2)-|(x_3,y_2)|+||(x_3,y_2)-|(x_4,y_2)|+||(x_1,y_3)-|(x_2,y_3)|+||(x_2,y_3)-|(x_3,y_3)|+|(x_3,y_3)-|(x_4,y_3)|.$$

It will be noted that, in a case where the mean of the absolute values of the differences between the gray-scale values of all two adjacent original pixels in the selected range of the third edge direction L3 is taken as the gradient value in the third edge direction L3, it is necessary to, on a basis of obtaining the sum of the absolute values of the differences between the gray-scale values of all two adjacent original pixels in the selected range of the third edge direction L3, divide the sum of the absolute values by the number of the absolute values of the differences between the gray-scale values.

For example, in the case where the third edge direction L3 is parallel to the line having an angle of 0° with the horizontal direction, the (n×n) neighborhood is the (4×4) neighborhood, and the selected range is the range of the rectangular box shown in FIG. 12, if the mean of the absolute values of the differences between the gray-scale values of all two adjacent original pixels in the rectangular box in the direction of 0° is taken as the gradient value in the direction of 0°, the above $G_0°$ needs to be divided by 6.

In S414, a sum or a mean of absolute values of differences between gray-scale values of all two adjacent original pixels in a selected range of the fourth edge direction L4 is taken as a gradient value in the fourth edge direction L4.

Figure 13:
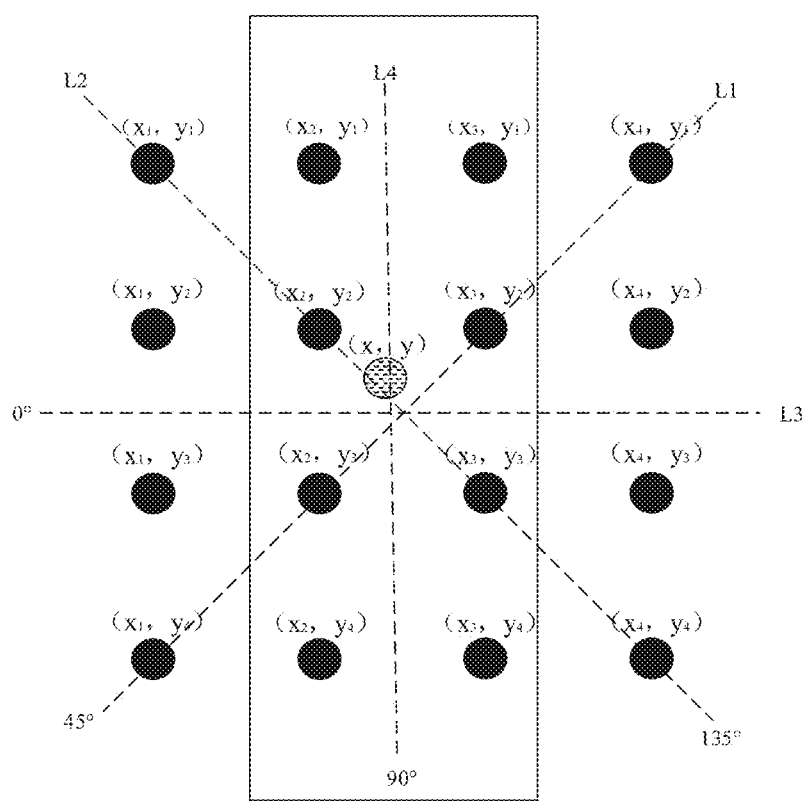
FIG. 13 is a schematic diagram of original pixels within a selected range in a fourth edge direction in an image processing method, in accordance with some embodiments.

For example, the fourth edge direction L4 is parallel to the line having an angle of 90° with the horizontal direction, the (n×n) neighborhood is the (4×4) neighborhood, and the selected range is a range of the rectangular box shown in FIG. 13. As shown in FIG. 13, considering an example in which the sum of the absolute values of the differences between the gray-scale values of all two adjacent original pixels in the rectangular box in the direction of 90° is the gradient value in the direction of 90° (i.e., $G_{90}°$), the gradient value is obtained through the following formula:

$$G_{90}°=||(x_2,y_1)-|(x_2,y_2)|+||(x_2,y_2)-|(x_2,y_3)|+||(x_2,y_3)-|(x_2,y_4)|+||(x_3,y_1)-|(x_3,y_2)|+||(x_3,y_2)-|(x_3,y_3)|+||(x_3,y_3)-|(x_3,y_4)|.$$

It will be noted that, in a case where the mean of the absolute values of the differences between the gray-scale values of all two adjacent original pixels in the selected range of the fourth edge direction L4 is taken as the gradient value in the fourth edge direction L4, it is necessary to, on a basis of obtaining the sum of the absolute values of the differences between the gray-scale values of all two adjacent original pixels in the selected range of the fourth edge direction L4, divide the sum of the absolute values by the number of the absolute values of the differences between the gray-scale values.

For example, in the case where the fourth edge direction L4 is parallel to the line having an angle of 90° with the horizontal direction, the (n×n) neighborhood is the (4×4) neighborhood, and the selected range is the range of the rectangular box shown in FIG. 13, if the mean of the absolute values of the differences between the gray-scale values of all two adjacent original pixels in the rectangular box in the direction of 90° is taken as the gradient value in the direction of 90°, the above $G_{90}°$ needs to be divided by 6.

It will be noted that, the above S411, S412, S413 and S414 are not performed in a particular order. S411, S412, S413, and S414 may be performed in sequence. Alternatively, S412, S411, S413, and S414 may be performed in sequence. The embodiments of the present disclosure is not limited thereto.

Figure 4:
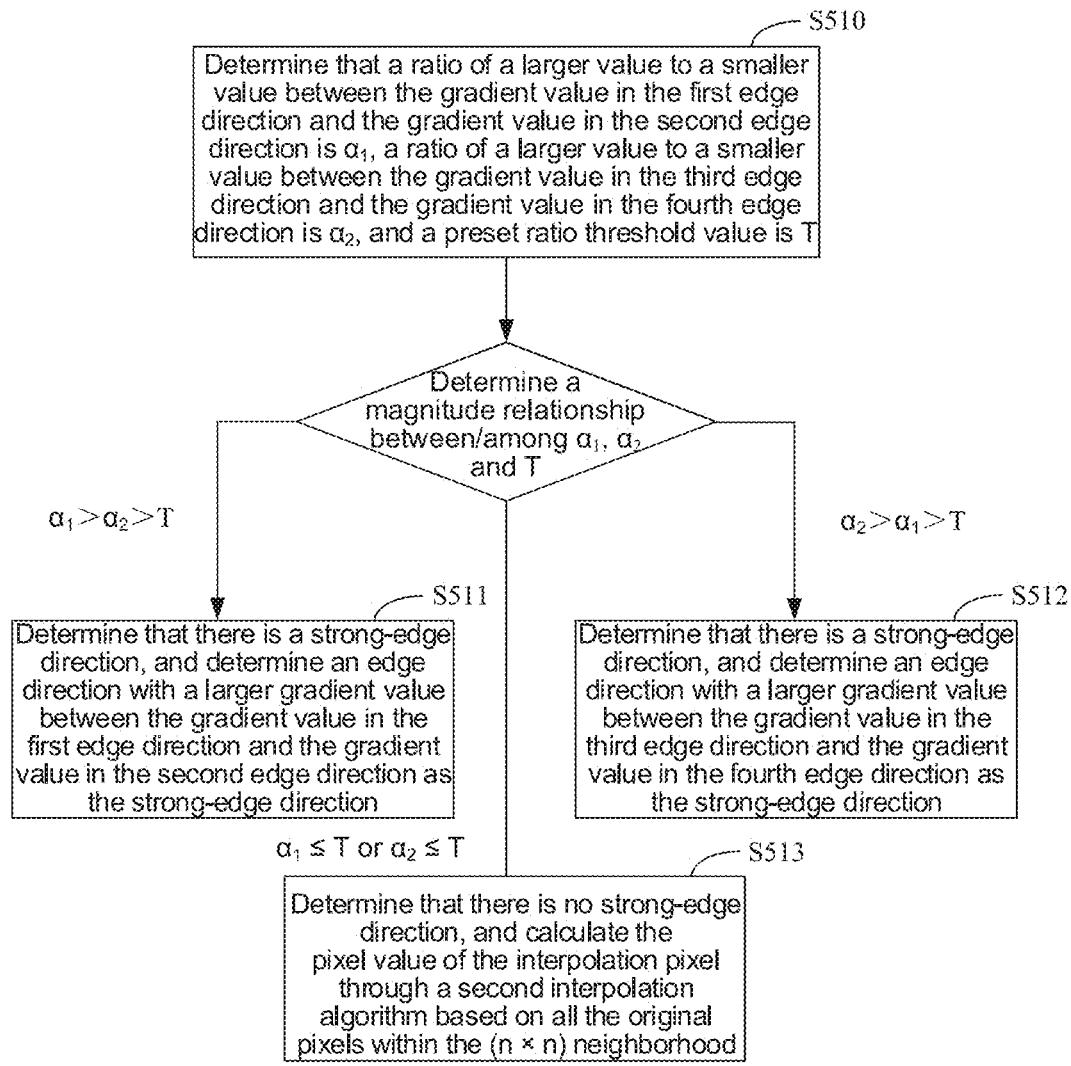
FIG. 4 is a flow diagram of yet another image processing method, in accordance with some embodiments.

On this basis, whether there is the strong-edge direction in the first edge direction L1, the second edge direction L2, the third edge direction L3 and the fourth edge direction L4 is determined according to the gradient value in the first edge direction L1, the gradient value in the second edge direction L2, the gradient value in the third edge direction L3 and the gradient value in the fourth edge direction L4. As shown in FIG. 4, S50 includes steps S510 to S513.

In S510, it is determined that a ratio of a larger value to a smaller value between the gradient value in the first edge direction L1 and the gradient value in the second edge direction L2 is $\alpha_1$, a ratio of a larger value to a smaller value between the gradient value in the third edge direction L3 and the gradient value in the fourth edge direction L4 is $\alpha_2$, and a preset ratio threshold value is T.

That is:

$$\alpha_1 = \text{Max}(G_1, G_2)/\text{Min}(G_1, G_2);$$

$$\alpha_2 = \text{Max}(G_3, G_4)/\text{Min}(G_3, G_4).$$

Where $G_1$ is the gradient value in the first edge direction L1, $G_2$ is the gradient value in the second edge direction L2, $G_3$ is the gradient value in the third edge direction L3, and $G_4$ is the gradient value in the fourth edge direction L4.

For example, in the case where the sum of the absolute values is used as the gradient value in the first edge direction L1, the first edge direction L1 is parallel to the line having an angle of 45° with the horizontal direction, the (n×n) neighborhood is the (4×4) neighborhood, and the selected range is the range of the rectangular box shown in FIG. 10, $G_1$ is equal to $G_{45}°$ ($G_1 = G_{45}°$).

For example, in the case where the sum of the absolute values is used as the gradient value in the second edge direction L2, the second edge direction L2 is parallel to the line having an angle of 135° with the horizontal direction, the (n×n) neighborhood is the (4×4) neighborhood, and the selected range is the range of the rectangular box shown in FIG. 11, $G_2$ is equal to $G_{135}°$ ($G_2 = G_{135}°$).

For example, in the case where the sum of the absolute values is used as the gradient value in the third edge direction L3, the third edge direction L3 is parallel to the line having an angle of 0° with the horizontal direction, the (n×n) neighborhood is the (4×4) neighborhood, and the selected range is the range of the rectangular box shown in FIG. 12, $G_3$ is equal to $G_0°$ ($G_3 = G_0°$).

For example, in the case where the sum of absolute values is used as the gradient value in the fourth edge direction L4, the fourth edge direction L4 is parallel to the line having an angle of 90° with the horizontal direction, the (n×n) neighborhood is the (4×4) neighborhood, and the selected range is the range of the rectangular box shown in FIG. 13, $G_4$ is equal to $G_{90}°$ ($G_4 = G_{90}°$).

In some embodiments, the preset ratio threshold value is in a range of 1.2 to 1.3, inclusive. For example, the preset ratio threshold value may be 1.2, 1.25, 1.26, 1.27, 1.28, 1.29, or 1.3.

It will be noted that, in the case where the sum of the absolute values of the differences between the gray-scale values of all two adjacent original pixels in the selected range of the edge direction is taken as the gradient value in the edge direction, in a process of determining the ratio of the larger value to the smaller value between two gradient values, in respective edge directions corresponding to the two gradient values, the numbers of the original pixels for calculating the gradient values included in the selected ranges are equal to each other.

For example, as shown in FIG. 10, the selected range of the first edge direction L1 includes 10 original pixels; as shown in FIG. 11, the selected range of the second edge direction L2 includes 10 original pixels; as shown in FIG. 12, the selected range of the third edge direction L3 includes 8 original pixels; as shown in FIG. 13, the selected range of the fourth edge direction L4 includes 8 original pixels.

After obtaining $\alpha_1$, $\alpha_2$ and T, a magnitude relationship between/among $\alpha_1$, $\alpha_2$ and T is determined.

If $\alpha_1$ is greater than $\alpha_2$, and $\alpha_2$ is greater than T ($\alpha_1 > \alpha_2 > T$), it is determined that the texture type of the (n×n) neighborhood is the edge texture shown in the portion 8A of FIG. 8, and the first edge direction L1 or the second edge direction L2 is the strong-edge direction, the step S511 is performed.

If $\alpha_2$ is greater than $\alpha_1$, and $\alpha_1$ is greater than T ($\alpha_2 > \alpha_1 > T$), it is determined that the texture type of the (n×n) neighborhood is the edge texture shown in the portion 8A of FIG. 8, and the third edge direction L3 or the fourth edge direction L4 is the strong-edge direction, the step S512 is performed.

If $\alpha_1$ is less than or equal to T ($\alpha_1 \leq T$) and/or $\alpha_2$ is less than or equal to T ($\alpha_2 \leq T$), it is determined that the texture type of the (n×n) neighborhood is the smooth texture shown in the portion 8B of FIG. 8, the step S513 is performed.

The magnitude relationship between/among $\alpha_1$, $\alpha_2$ and T may be determined by directly comparing magnitudes of the three, or by comparing the magnitude between $\alpha_1$ and $\alpha_2$, then comparing the smaller one between $\alpha_1$ and $\alpha_2$ with T. Other methods may also be used, and the embodiments of the present disclosure is not limited thereto.

In S511, it is determined that there is the strong-edge direction, and an edge direction with a larger gradient value between the gradient value in the first edge direction L1 and the gradient value in the second edge direction L2 is determined as the strong-edge direction.

For example, if $G_1$ is greater than $G_2$ ($G_1 > G_2$), the first edge direction L1 is determined as the strong-edge direction; if $G_2$ is greater than $G_1$ ($G_2 > G_1$), the second edge direction L2 is determined as the strong-edge direction.

In S512, it is determined that there is the strong-edge direction, and an edge direction with a larger gradient value between the gradient value in the third edge direction L3 and the gradient value in the fourth edge direction L4 is determined as the strong-edge direction.

For example, if $G_3$ is greater than $G_4$ ($G_3 > G_4$), the third edge direction L3 is determined as the strong-edge direction; if $G_4$ is greater than $G_3$ ($G_4 > G_3$), the fourth edge direction L4 is determined as the strong-edge direction.

In S513, it is determined that there is no strong-edge direction, and the pixel value of the interpolation pixel is calculated through the second interpolation algorithm based on all the original pixels within the (n×n) neighborhood.

As described above, the number of the edge directions used to determine the texture type is not limited, for example, it may be two, three or four.

In some embodiments, two edge directions, which are the first edge direction L1 and the second edge direction L2, are used to determine the texture type.

In some examples, as shown in FIG. 9, the first edge direction L1 is substantially perpendicular to the second edge direction L2. For example, the first edge direction L1 is substantially parallel to one of the two diagonals of the rectangle determined by the (n×n) neighborhood, the second edge direction L2 is substantially parallel to the other of the two diagonals of the rectangle determined by the (n×n) neighborhood. The rectangle determined by the (n×n) neighborhood is the rectangle enclosed by the line segments connecting the pixels on the outermost side within the (n×n) neighborhood.

For example, the first edge direction L1 is parallel to the line having an angle of 45° with the horizontal direction, and the second edge direction L2 is parallel to the line having an angle of 135° with the horizontal direction.

It will be noted that, the first edge direction L1 and the second edge direction L2 may also be other directions. For example, the first edge direction L1 may be a direction of 30°, and the second edge direction L2 may be a direction of 120°.

Figure 5:
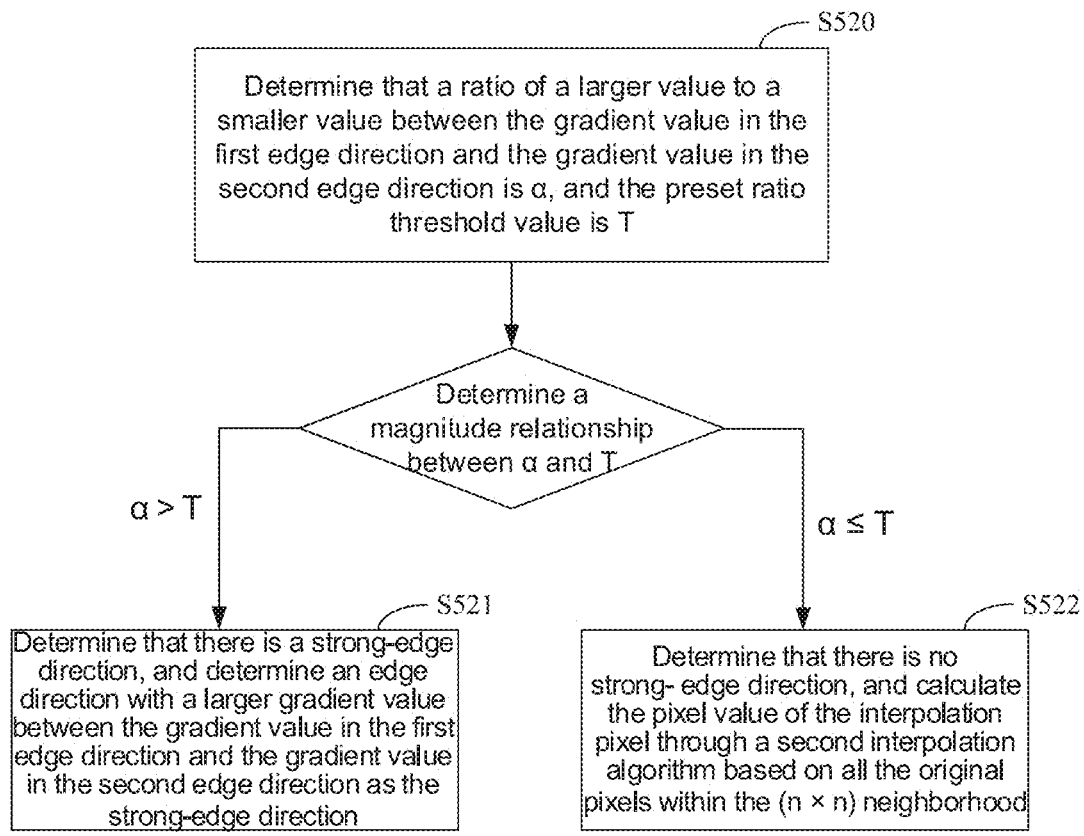
FIG. 5 is a flow diagram of yet another image processing method, in accordance with some embodiments.

In a case where the at least two edge directions include the first edge direction L1 and the second edge direction L2, in the process of determining whether there is the strong-edge direction between the first edge direction L1 and the second edge direction L2, as shown in FIG. 5, S50 includes steps S520 to S522.

In S520, it is determined that the ratio of the larger value to the smaller value between the gradient value in the first edge direction L1 and the gradient value in the second edge direction L2 is α, and the preset ratio threshold value is T.

In some embodiments, the preset ratio threshold value is in the range of 1.2 to 1.3, inclusive. For example, the preset ratio threshold value may be 1.2, 1.25, 1.26, 1.27, 1.28, 1.29, or 1.3.

It will be noted that, in a case where the sum of the absolute values of the differences between the gray-scale values of all two adjacent original pixels in the selected range of the edge direction is taken as the gradient value in the edge direction, in the process of determining the ratio of the larger value to the smaller value between the two gradient values, in respective edge directions corresponding to the two gradient values, the numbers of the original pixels for calculating the gradient values included in the selected ranges are equal to each other.

For example, as shown in FIG. 10, the selected range of the first edge direction L1 includes 10 original pixels; as shown in FIG. 11, the selected range of the second edge direction L2 includes 10 original pixels.

In addition, the calculation process of the gradient value in the first edge direction L1 and the gradient value in the second edge direction L2 in the case where the at least two edge directions include the first edge direction L1 and the second edge direction L2 is similar to the calculation process of the gradient value in the first edge direction L1 and the gradient value in the second edge direction L2 in the case where the at least two edge directions include the first edge direction L1, the second edge direction L2, the third edge direction L3 and fourth edge direction L4, which will not be repeated here.

After obtaining α and T, a magnitude relationship between α and T is determined.

If α is greater than T (α>T), the step S521 is performed.

If α is less than or equal to T (α<T), the step S522 is performed.

In S521, it is determined that there is the strong-edge direction, and an edge direction with a larger gradient value between the gradient value in the first edge direction L1 and the gradient value in the second edge direction L2 is determined as the strong-edge direction.

In S522, it is determined that there is no strong-edge direction, and the pixel value of the interpolation pixel is calculated through the second interpolation algorithm based on all the original pixels within the (n×n) neighborhood.

As described above, the number of the edge directions used to determine the texture type is not limited, for example, it may be two, three or four.

In some embodiments, three edge directions, which are the first edge direction L1, the second edge direction L2 and the third edge direction L3, are used to determine the texture type.

In some examples, as shown in FIG. 9, the first edge direction L1 is substantially perpendicular to the second edge direction L2. For example, the first edge direction L1 is substantially parallel to one of the two diagonals of the rectangle determined by the (n×n) neighborhood, the second edge direction L2 is substantially parallel to the other of the two diagonals of the rectangle determined by the (n×n) neighborhood. The rectangle determined by the (n×n) neighborhood is the rectangle enclosed by the line segments connecting the pixels on the outermost side within the (n×n) neighborhood.

For example, the first edge direction L1 is parallel to the line having an angle of 45° with the horizontal direction, and the second edge direction L2 is parallel to the line having an angle of 135° with the horizontal direction.

In some embodiments, as shown in FIG. 9, the included angle between the first edge direction L1 and the third edge direction L3 is substantially 45°. For example, the third edge direction L3 is substantially parallel to the row direction of the plurality of pixels arranged within the (n×n) neighborhood.

For example, the third edge direction L3 is parallel to the line having an angle of 0° with the horizontal direction.

It will be noted that, the first edge direction L1, the second edge direction L2, and the third edge direction L3 may also be other directions. For example, the first edge direction L1 may be a direction of 60°, the second edge direction L2 may be a direction of 120°, and the third edge direction L3 may be a direction of 0°.

Figure 6:
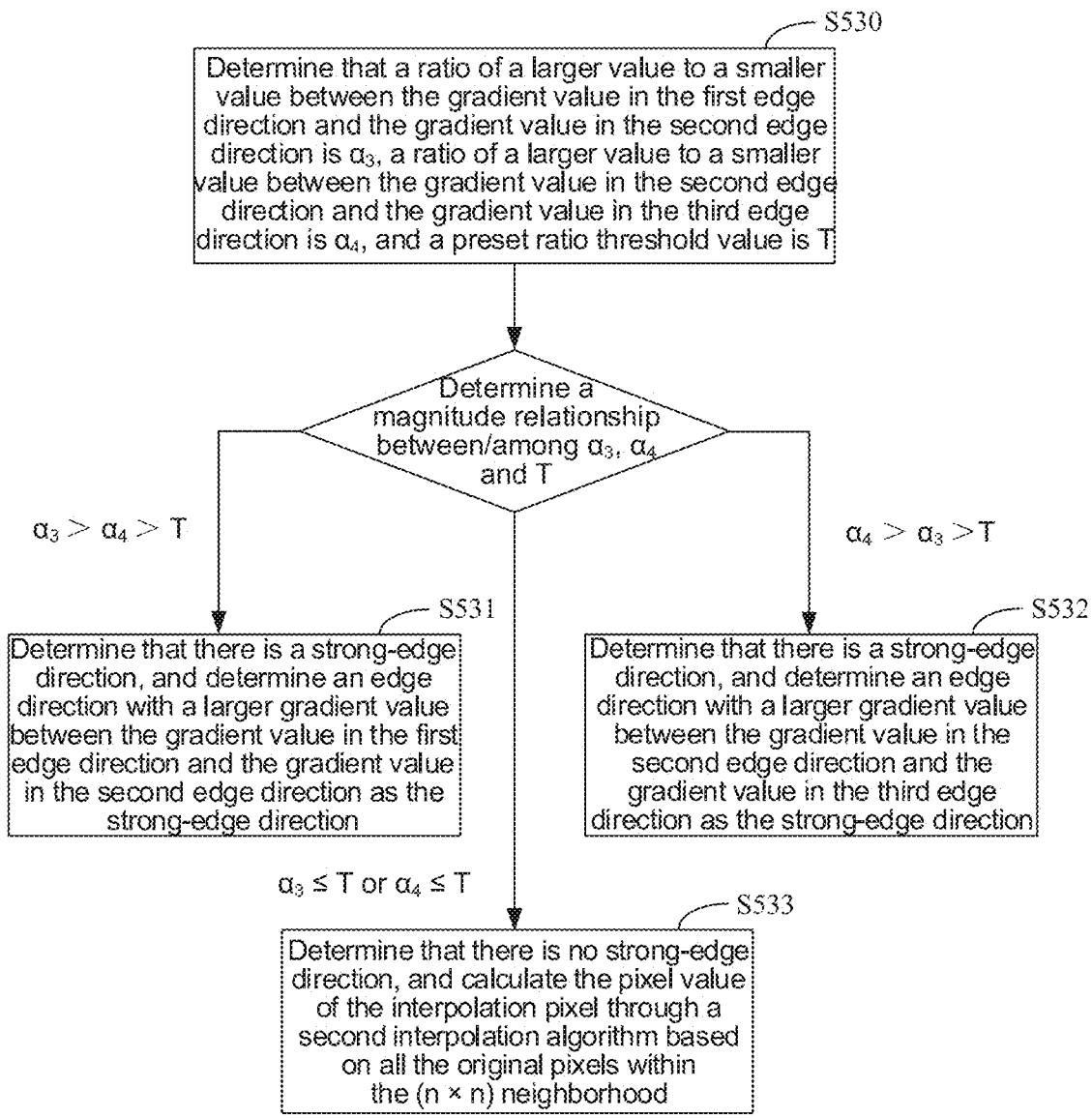
FIG. 6 is a flow diagram of yet another image processing method, in accordance with some embodiments.

In a case where the at least two edge directions include the first edge direction L1, the second edge direction L2 and the third edge direction L3, in a process of determining whether there is the strong-edge in the first edge direction L1, the second edge direction L2 and the third edge direction L3, as shown in FIG. 6, S50 includes steps S530 to S533.

In S530, it is determined that the ratio of the larger value to the smaller value between the gradient value in the first edge direction L1 and the gradient value in the second edge direction L2 is $\alpha_3$, and the ratio of the larger value to the smaller value between the gradient value in the second edge direction L2 and the gradient value in the third edge direction L3 is $\alpha^4$, and the preset ratio threshold value is T.

Similarly, the preset ratio threshold value is in the range of 1.2 to 1.3, inclusive. For example, the preset ratio threshold value is 1.2, 1.25, 1.26, 1.27, 1.28, 1.29, or 1.3.

It will be noted that, in a case where the sum of the absolute values of the differences between the gray-scale values of all two adjacent original pixels in the selected range of the edge direction is taken as the gradient value in the edge direction, in the process of determining the ratio of the larger value to the smaller value of two gradient values, in respective edge directions corresponding to the two gradient values, the numbers of the original pixels for calculating the gradient values included in the selected range are equal to each other.

For example, the selected range of the first edge direction L1 includes 10 original pixels; the selected range of the second edge direction L2 includes 10 original pixels; and the selected range of the third edge direction L3 includes 10 original pixels.

In addition, the calculation process of the gradient value in the first edge direction L1, the gradient value in the second edge direction L2 and the gradient value in third edge direction L3 in the case where the at least two edge directions include the first edge direction L1, the second edge direction L2 and the third edge direction L3 is similar to the calculation process of the gradient value in the first edge direction L1, the gradient value in the second edge direction L2 and the gradient value in third edge direction L3 in the case where the at least two edge directions include the first edge direction L1, the second edge direction L2, the third edge direction L3 and the fourth edge direction L4, which will not be repeated here.

After obtaining $\alpha_3$, $\alpha_4$ and T, the magnitude relationship between/among $\alpha_3$, $\alpha_4$ and T is determined.

If $\alpha_3$ is greater than $\alpha_4$, and $\alpha_4$ is greater than T ($\alpha_3 > \alpha_4 > T$), the step S531 is performed.

If $\alpha_4$ is greater than $\alpha_3$, and $\alpha_3$ is greater than T ($\alpha_4 > \alpha_3 > T$), the step S532 is performed.

If $\alpha_3$ is less than or equal to T ($\alpha_3 \leq T$), and/or $\alpha_4$ is less than or equal to T ($\alpha_4 \leq T$), the step S533 is performed.

In S531, it is determined that there is the strong-edge direction, and an edge direction with a larger gradient value between the gradient value in the first edge direction L1 and the gradient value in the second edge direction L2 is determined as the strong-edge direction.

In S532, it is determined that there is the strong-edge direction, and an edge direction with a larger gradient value between the gradient value in the second edge direction L2 and the gradient value in the third edge direction L3 is determined as the strong-edge direction.

In S533, it is determined that there is no strong-edge direction, and the pixel value of the interpolation pixel is calculated through the second interpolation algorithm based on all the original pixels within the (n×n) neighborhood.

Figure 14:
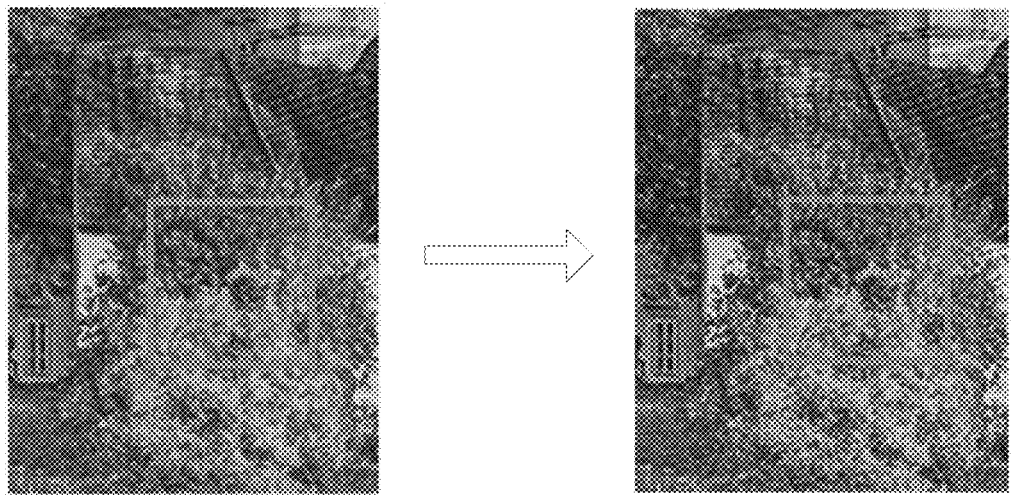
FIG. 14 is a comparison diagram showing effects before and after being processed in an image processing method, in accordance with some embodiments.
Figure 15:
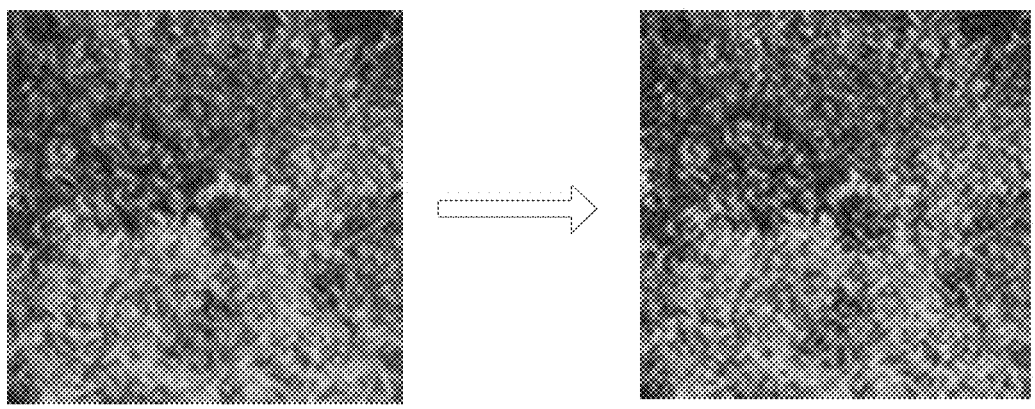
FIG. 15 is a partial enlarged view of the region in the box in FIG. 14.

As shown in FIG. 14, after the original image at the left side is performed the resolution enhancement using the image processing method in some embodiments of the present disclosure, the definition of the obtained target image at the right side is significantly improved. From FIG. 15, which shows the partial enlarged view of the region in the rectangular box in FIG. 14, the effect of improved definition may be more clearly illustrated.

To sum up, when the image is performed the resolution enhancement of by the image processing method in some embodiments of the present disclosure, the texture type is determined by determining the strong-edge direction in combination with calculating of the two-dimensional image entropy, and the pixel value of the interpolation pixel is calculated through different interpolation algorithms according to different texture types. As a result, it is possible to enhance the resolution of the image and improve the definition of the image.

In addition, the position coordinates of the interpolation pixel in the target image are mapped into the original image through the mapping formulas, thus the resolution enhancement for the original image may be achieved in any scale (e.g., integer scale, decimal scale, odd scale, or even scale).

Figure 16:
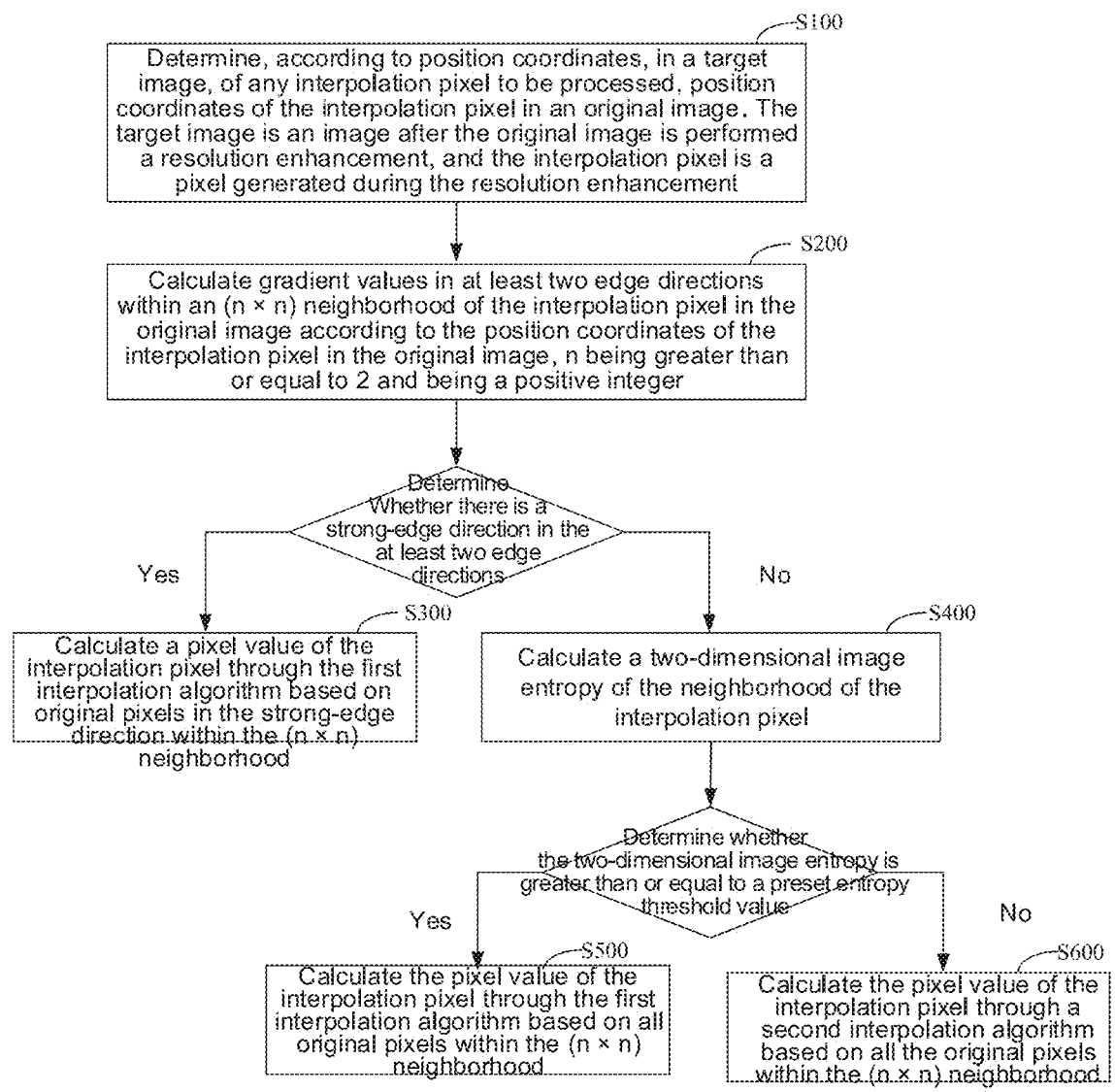
FIG. 16 is a flow diagram of another image processing method, in accordance with some embodiments.

Some embodiments of the present disclosure provide an image processing method. As shown in FIG. 16, the image processing method includes steps S100 to S600.

In S100, according to position coordinates, in a target image, of any interpolation pixel to be processed, position coordinates of the interpolation pixel in an original image are determined. The target image is an image after the original image is performed a resolution enhancement, and the interpolation pixel is a pixel generated during the resolution enhancement.

The step S100 may refer to the step S10 in the image processing method in some of the above embodiments, and will not be repeated here.

In S200, gradient values in at least two edge directions within an (n×n) neighborhood of the interpolation pixel in the original image are calculated according to the position coordinates of the interpolation pixel in the original image, n is greater than or equal to 2 (n≥2) and n is a positive integer.

The step S200 may refer to the step S40 in the image processing method in some of the above embodiments, which will not be repeated here.

After obtaining the gradient value in each edge direction, it is determined whether there is a strong-edge direction in the at least two edge directions according to the gradient values in the at least two edge directions. If there is the strong-edge direction, the step S300 is performed; if there is no strong-edge direction, the step S400 is performed.

In S300, a pixel value of the interpolation pixel is calculated through a first interpolation algorithm based on a plurality of original pixels in the strong-edge direction within the (n×n) neighborhood.

The step S300 may refer to the step S50 in the image processing method in some of the above embodiments, which will not be repeated here.

In S400, a two-dimensional image entropy of the (n×n) neighborhood of the interpolation pixel is calculated.

The step S400 may refer to the step S20 in the image processing method in some of the above embodiments, which will not be repeated here.

After obtaining the two-dimensional image entropy, it is determined whether the two-dimensional image entropy is greater than or equal to a preset entropy threshold value. In a case where the two-dimensional image entropy is greater than or equal to the preset entropy threshold value, the step S500 is performed; in a case where the two-dimensional image entropy is less than the preset entropy threshold value, the step S600 is performed.

In S500, the pixel value of the interpolation pixel is calculated through the first interpolation algorithm based on all original pixels within the (n×n) neighborhood.

The step S500 may refer to the step S30 in the image processing method in some of the above embodiments, which will not be repeated here.

In S600, the pixel value of the interpolation pixel is calculated through a second interpolation algorithm based on all the original pixels within the (n×n) neighborhood.

The step S600 may refer to the step S60 in the image processing method in some of the above embodiments, which will not be repeated here.

In the image processing method, it is determined whether there is the strong-edge direction in the at least two edge directions first. In the case where there is the strong-edge direction, the pixel value of the interpolation pixel is calculated through the first interpolation algorithm; in the case where there is no strong-edge direction, the two-dimensional image entropy is calculated. The two-dimensional image entropy is compared with the preset entropy threshold value, and the pixel value of the interpolation pixel is calculated through the first interpolation algorithm or the second interpolation algorithm according to the comparison result.

The beneficial effects of the image processing method as described in some embodiments of the present disclosure are the same as the beneficial effects of the image processing method as described in any of the above embodiments, which will not be repeated here.

The image processing method provided by the embodiments of the present disclosure is mainly described above. Some embodiments of the present disclosure further provide an image processing apparatus for realizing the image processing method above, and the image processing apparatus will be exemplarily introduced below.

Figure 17:
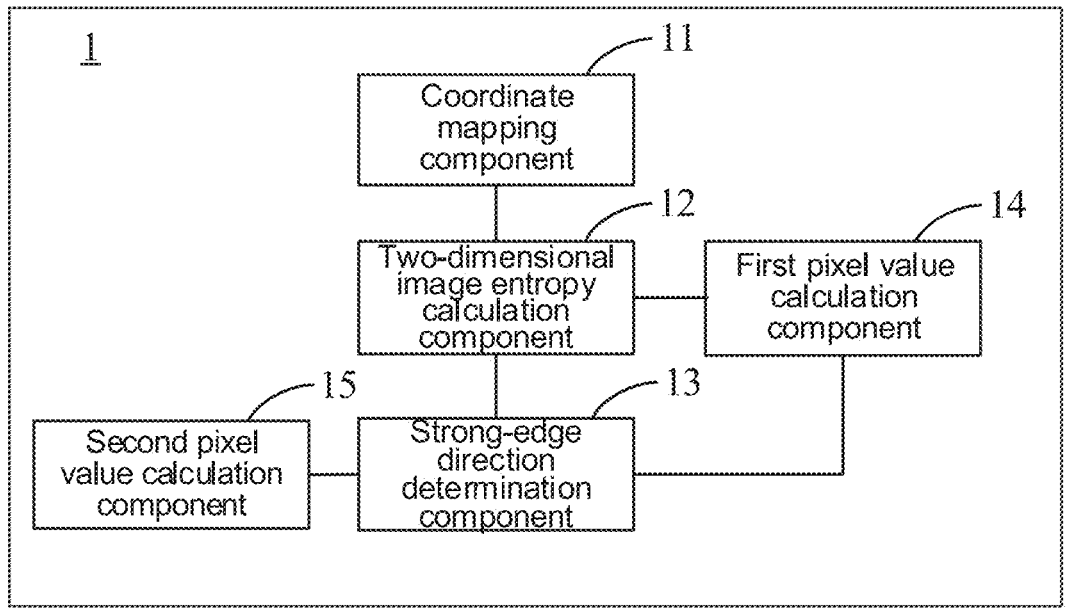
FIG. 17 is a structural diagram of an image processing apparatus, in accordance with some embodiments.
Figure 18:
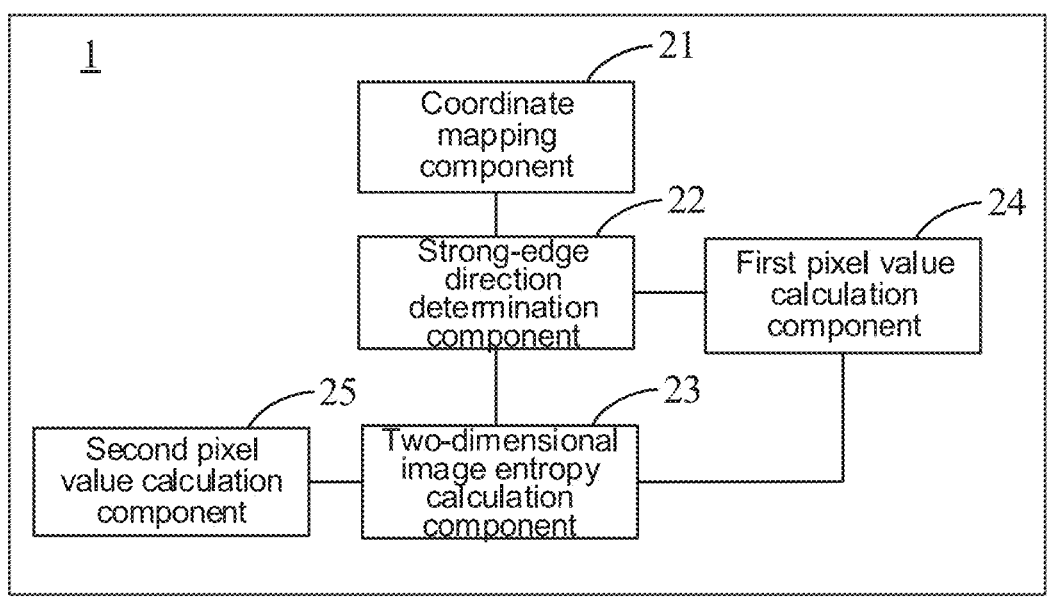
FIG. 18 is a structural diagram of another image processing apparatus, in accordance with some embodiments.

In some embodiments, as shown in FIGS. 17 and 18, the image processing apparatus 1 may include a coordinate mapping component 11 (21), a two-dimensional image entropy calculation component 12 (23), a strong-edge direction determination component 13 (22), a first pixel value calculation component 14 (24) and a second pixel value calculation component 15 (25).

The coordinate mapping component 11 (21) is configured to determine, according to position coordinates, in a target image, of any interpolation pixel to be processed, position coordinates of the interpolation pixel in an original image. The target image is an image after the original image is performed a resolution enhancement, and the interpolation pixel is a pixel generated during the resolution enhancement.

In some embodiments, as shown in FIG. 17, the coordinate mapping component 11 may be configured to perform the above step S10. The operation process of the coordinate mapping component 11 may refer to the corresponding process of the step S10 in the above embodiments, which will not be repeated here.

In some embodiments, as shown in FIG. 18, the coordinate mapping component 21 may be configured to perform the above step S100. The operation process of the coordinate mapping component 21 may refer to the corresponding process of the step S100 in the above embodiments, which will not be repeated here.

The two-dimensional image entropy calculation component 12 (23) is configured to calculate a two-dimensional image entropy of an (n×n) neighborhood of the interpolation pixel in the original image according to the position coordinates of the interpolation pixel in the original image, n is greater than or equal to 2 (n≥2) and n is a positive integer.

In some embodiments, as shown in FIG. 17, the two-dimensional image entropy calculation component 12 may be configured to perform the above step S20. The operation process of the two-dimensional image entropy calculation component 12 may refer to the corresponding process of the step S20 in the above method embodiments, which will not be repeated here.

In some embodiments, as shown in FIG. 18, the two-dimensional image entropy calculation component 23 may be configured to perform the above step S400. The operation process of the two-dimensional image entropy calculation component 23 may refer to the corresponding process of the step S400 in the above method embodiments, which will not be repeated here.

The strong-edge direction determination component 13 (22) is configured to calculate gradient values in at least two edge directions within the (n×n) neighborhood of the interpolation pixel in the original image according to the position coordinates of the interpolation pixel in the original image, and determine whether there is a strong-edge direction in the at least two edge directions according to the gradient values in the at least two edge directions.

In some embodiments, as shown in FIG. 17, the strong-edge direction determination component 13 may be configured to perform the above step S40. The operation process of the strong-edge direction determination component 13 may refer to the corresponding process of the step S40 in the above method embodiments, which will not be repeated here.

In some embodiments, as shown in FIG. 18, the strong-edge direction determination component 22 may be configured to perform the above step S200. The operation process of the strong-edge direction determination component 22 may refer to the corresponding process of the step S200 in the above method embodiments, which will not be repeated here.

The first pixel value calculation component 14 (24) is configured to, in a case where there is the strong-edge direction in the at least two edge directions, calculate a pixel value of the interpolation pixel through a first interpolation algorithm based on a plurality of original pixels in the strong-edge direction within the (n×n) neighborhood; and in a case where the two-dimensional image entropy is greater than or equal to a preset entropy threshold value, calculate the pixel value of the interpolation pixel through the first interpolation algorithm based on all original pixels within the (n×n) neighborhood.

In some embodiments, as shown in FIG. 17, the first pixel value calculation component 14 may be configured to perform the above steps S30 and S50. The operation process of the first pixel value calculation component 14 may refer to the corresponding processes of the steps S30 and S50 in the above method embodiments, which will not be repeated here.

In some embodiments, as shown in FIG. 18, the first pixel value calculation component 24 may be configured to perform the above steps S300 and S500. The operation process of the first pixel value calculation component 24 may refer to the corresponding processes of the steps S300 and S500 in the above method embodiments, which will not be repeated here.

The second pixel value calculation component 15 (25) is configured to, in a case where the two-dimensional image entropy is less than the preset entropy threshold value and there is no strong-edge direction in the at least two edge directions, calculate the pixel value of the interpolation pixel through a second interpolation algorithm based on all the original pixels within the (n×n) neighborhood.

In some embodiments, as shown in FIG. 17, the second pixel value calculation component 15 may be configured to perform the above step S60. The operation process of the second pixel value calculation component 15 may refer to the corresponding process of the step S60 in the above method embodiments, which will not be repeated here.

In some embodiments, as shown in FIG. 18, the second pixel value calculation component 25 may be configured to perform the above step S600. The operation process of the second pixel value calculation component 25 may refer to the corresponding process of the step S600 in the above method embodiments, which will not be repeated here.

The beneficial effects of the image processing apparatus 1 in some embodiments of the present disclosure are the same as the beneficial effects of the image processing method as described in any of the above embodiments, which will not be repeated here.

Figure 19:
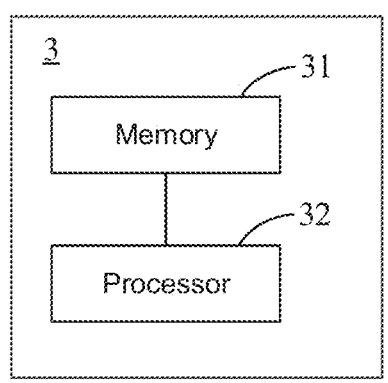
FIG. 19 is a structural diagram of an electronic device, in accordance with some embodiments.
Figure 1:
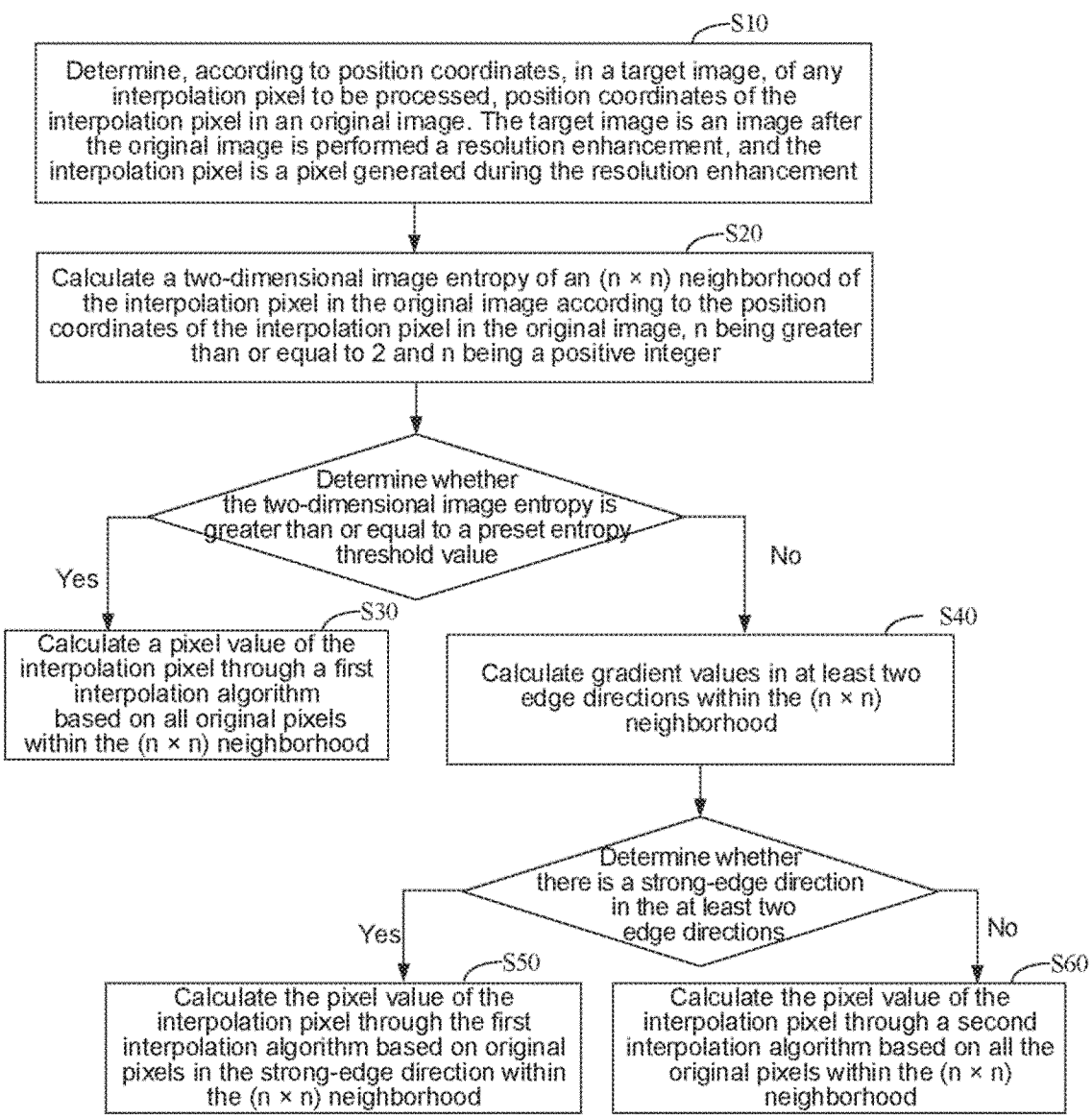
Figure 2:
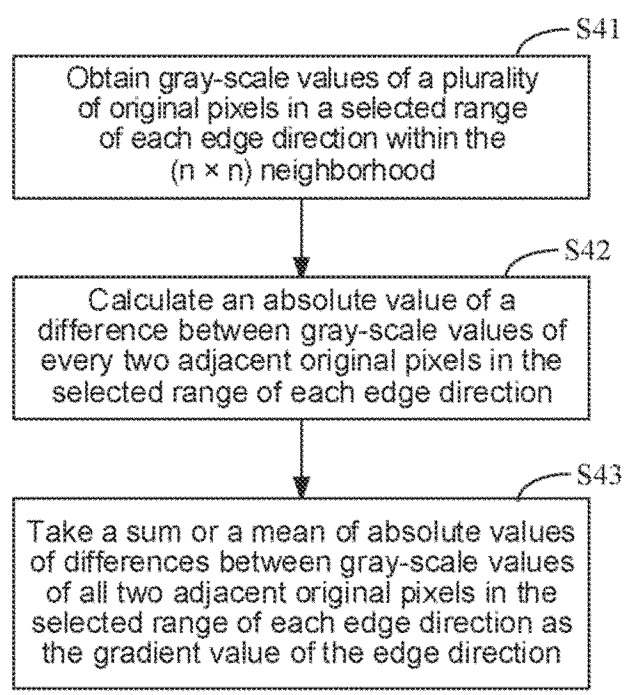
Figure 7:
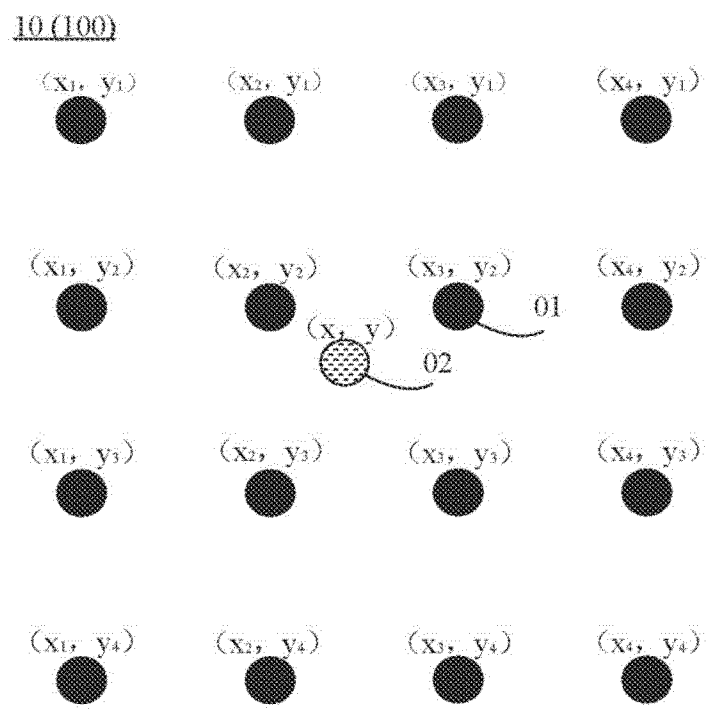
Figure 8:
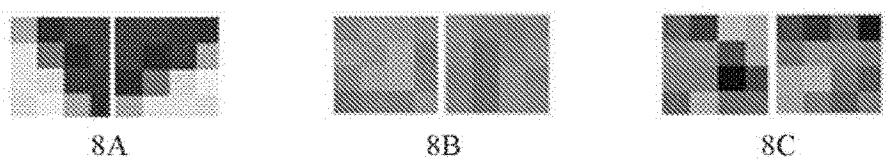
Figure 16:
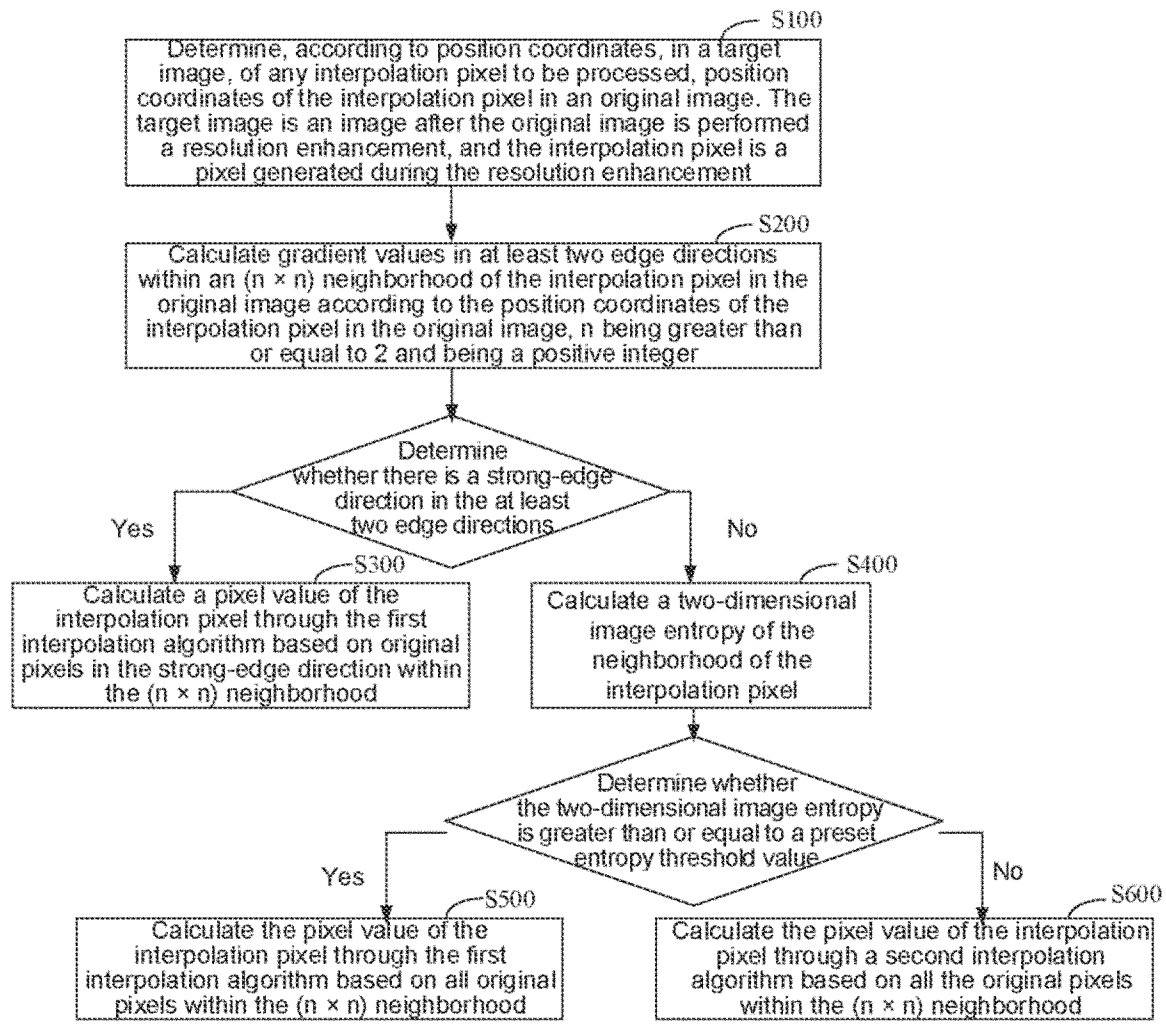
Figure 19:
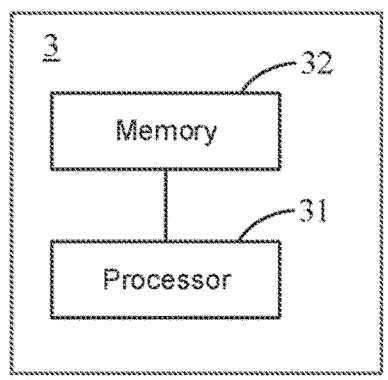

Some embodiments of the present disclosure further provide an electronic device 3. As shown in FIG. 19, the electronic device 3 includes a processor 31 and a memory 32. The memory 32 has stored therein computer program instructions adapted to be executed by the processor 31. The computer program instructions, when run on the processor 31, cause the processor 31 to execute the image processing method as described in any of the above embodiments.

The processor 31 is configured to support the electronic device 3 to execute one or more steps of the image processing method as described above.

The processor 31 may be a central processing unit (CPU), a general-purpose processor, a digital signal processor (DSP), an application specific integrated circuit (ASIC), a field programmable gate array (FPGA) or any other programmable logic device, a discrete gate or transistor logic device, a discrete hardware component, etc. The general-purpose processor may be a microprocessor, any conventional processor or the like.

The memory 32 is used to store program codes and data of the electronic device 3 provided by the embodiments of the present disclosure. The processor 31 may implement various functions of the electronic device 3 by running or executing software programs stored in the memory 32 and calling the data stored in the memory 32.

The memory 32 may be a read-only memory (ROM) or a static storage device of any other type that may store static information and instructions, a random access memory (RAM) or a dynamic storage device of any other type that may store information and instructions, or an electrically erasable programmable read-only memory (EEPROM), a compact disc read-only memory (CD-ROM) or any other compact disc storage or optical disc storage (including a compressed disc, a laser disc, an optical disc, a digital versatile disc, or a blue-ray disc), a magnetic disc storage medium or any other magnetic storage device, or any other medium that can be used to carry or store desired program codes in a form of instructions or data structures and that can be accessed by a computer, but it is not limited thereto. The memory may exist independently and is connected to the processor via a communication bus. The memory 32 may also be integrated with the processor 31.

Some embodiments of the present disclosure further provide a computer-readable storage medium (e.g., a non-transitory computer-readable storage medium). The computer-readable storage medium has stored therein computer program instructions that, when run on a computer, cause the computer to execute the image processing method as described in any of the above embodiments.

For example, the computer-readable storage medium may include, but is not limited to: a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM), a card, a stick or a key driver).

Various computer-readable storage media described in the embodiments of the present disclosure may represent one or more devices and/or other machine-readable storage media, which are used to store information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed by a computer, cause the computer to execute the image processing method as described in any of the above embodiments.

Some embodiments of the present disclosure further provide a computer program. When the computer program is executed by a computer, the computer program causes the computer to execute the image processing method as described in any of the above embodiments.

Beneficial effects of the electronic device, the computer-readable storage medium, the computer program product and the computer program are the same as the beneficial effects of the image processing method as described in some of the above embodiments, which will not be repeated here.

It can be conscious by those skilled in the art that, the components and method steps of the examples described in the embodiments disclosed herein may be implemented in a form of electronic hardware, computer software, or a combination of both. In order to clearly illustrate an interchangeability of hardware and software, composition and steps of each example have been described generally in terms of functions in the above description. Whether these functions are executed through hardware or software depends on the specific application and restrictive conditions on design of the technical solution. A skilled person may implement the described functions in different ways for each specific application, but such implementation should not be considered as beyond the scope of the present disclosure.

In the embodiments provided in the present disclosure, it will be understood that, the disclosed apparatuses and methods may be implemented in other manners. For example, the embodiments of the apparatus described above are merely exemplary. For example, the division of components is merely an logical function division and there may be other divisions in actual implementation. For example, multiple components may be combined or can be integrated into another apparatus, or some features can be ignored or not executed.

The components described as separate components may be or may not be physically separate, and a certain or some component(s) may be or may not be physical unit(s). Some or all the components may be selected according to actual needs to achieve the objectives of the solutions in the embodiments of the present disclosure.

In addition, various functional components in some embodiments of the present disclosure may be integrated in a single processing unit, or each component may physically exist separately, or two or more components may be integrated in a single unit. The above integrated unit may be implemented in the form of hardware or in the form of software functional unit.

If the above integrated unit is implemented in the form of software functional unit, and is sold or used as an independent product, it may be stored in a computer-readable storage medium. Based on this understanding, the technical solution of the present disclosure essentially, or the part of contribution to the prior art, or part of the technical solution may be embodied in the form of a software product. The software product is stored in a storage medium and includes several instructions used to enable a computer device (which may be a personal computer, a server, a network device, or the like) to perform all or part of the steps of the method described in the embodiments of the present disclosure.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An image processing method applied to an electrical device, the electronic device includes a processor and a memory, the method comprising:
   determining, by the processor, according to position coordinates, in a target image, of any interpolation pixel to be processed of the target image, position coordinates of the interpolation pixel in an original image; the target image being an image after the original image is performed a resolution enhancement, and the interpolation pixel being a pixel generated during the resolution enhancement;
   calculating, by the processor, a two-dimensional image entropy of an (n×n) neighborhood of the interpolation pixel in the original image according to the position coordinates of the interpolation pixel in the original image, n being greater than or equal to 2 (n≥2) and n being a positive integer;

in a case where the two-dimensional image entropy is greater than or equal to a preset entropy threshold value, calculating, by the processor, a pixel value of the interpolation pixel through a first interpolation algorithm based on all original pixels within the (n×n) neighborhood;

in a case where the two-dimensional image entropy is less than the preset entropy threshold value, calculating, by the processor, gradient values in at least two edge directions within the (n×n) neighborhood, and determining, by the processor, whether there is a strong-edge direction in the at least two edge directions according to the gradient values in the at least two edge directions;

if there is the strong-edge direction, calculating, by the processor, the pixel value of the interpolation pixel through the first interpolation algorithm based on a plurality of original pixels in the strong-edge direction within the (n×n) neighborhood; and if there is no strong-edge direction, calculating, by the processor, the pixel value of the interpolation pixel through a second interpolation algorithm based on all the original pixels within the (n×n) neighborhood;

mapping, by the processor, the position coordinates of the interpolation pixel in the target image into the original image through a mapping formulas, so as to achieve the resolution enhancement for the original image in any scale.

2. The image processing method according to claim 1, wherein calculating the gradient values in the at least two edge directions within the (n×n) neighborhood, includes:

obtaining gray-scale values of a plurality of original pixels in a selected range of each edge direction within the (n×n) neighborhood;

calculating an absolute value of a difference between gray-scale values of every two adjacent original pixels in the selected range of each edge direction;

taking a sum or a mean of absolute values of differences between gray-scale values of all two adjacent original pixels in the selected range of each edge direction as a gradient value in the edge direction.

3. The image processing method according to claim 1, wherein the at least two edge directions include a first edge direction, a second edge direction, a third edge direction and a fourth edge direction; calculating the gradient values in the at least two edge directions within the (n×n) neighborhood, includes:

taking a sum or a mean of absolute values of differences between gray-scale values of all two adjacent original pixels in a selected range of the first edge direction as a gradient value in the first edge direction;

taking a sum or a mean of absolute values of differences between gray-scale values of all two adjacent original pixels in a selected range of the second edge direction as a gradient value in the second edge direction;

taking a sum or a mean of absolute values of differences between gray-scale values of all two adjacent original pixels in a selected range of the third edge direction as a gradient value in the third edge direction;

taking a sum or a mean of absolute values of differences between gray-scale values of all two adjacent original pixels in a selected range of the fourth edge direction as a gradient value in the fourth edge direction.

4. The image processing method according to claim 3, wherein determining whether there is the strong-edge direction in the at least two edge directions according to the gradient values in the at least two edge directions, includes:

determining a ratio $\alpha_1$ of a larger value to a smaller value between the gradient value in the first edge direction and the gradient value in the second edge direction, a ratio $\alpha_2$ of a larger value to a smaller value between the gradient value in the third edge direction and the gradient value in the fourth edge direction, and a preset ratio threshold value T;

in a case where $\alpha_1$ is greater than $\alpha_2$, and $\alpha_2$ is greater than T ($\alpha_1 > \alpha_2 > T$), determining that there is the strong-edge direction, and determining an edge direction with a larger gradient value between the gradient value in the first edge direction and the gradient value in the second edge direction as the strong-edge direction;

in a case where $\alpha_2$ is greater than $\alpha_1$, and $\alpha_1$ is greater than T ($\alpha_2 > \alpha_1 > T$), determining that there is the strong-edge direction, and determining an edge direction with a larger gradient value between the gradient value in the third edge direction and the gradient value in the fourth edge direction as the strong-edge direction;

in a case where $\alpha_1$ is less than or equal to T ($\alpha_1 \leq T$), and/or $\alpha_2$ is less than or equal to T ($\alpha_2 \leq T$), determining that there is no strong-edge direction.

5. The image processing method according to claim 4, wherein a sum of absolute values of differences between gray-scale values of all two adjacent original pixels in a selected range of an edge direction is taken as a gradient value in the edge direction; in a process of determining a ratio of a larger value to a smaller value between two gradient values, in respective edge directions corresponding to the two gradient values, numbers of original pixels for calculating the gradient values included in the selected ranges are equal to each other; and/or the preset ratio threshold value T is in a range of 1.2 to 1.3, inclusive.

6. The image processing method according to claim 1, wherein the at least two edge directions include a first edge direction and a second edge direction;

determining whether there is the strong-edge direction in the at least two edge directions according to the gradient values in the at least two edge directions, includes:

determining a ratio $\alpha$ of a larger value to a smaller value between a gradient value in the first edge direction and a gradient value in the second edge direction, and a preset ratio threshold value T;

in a case where a is greater than T ($\alpha > T$), determining that there is the strong-edge direction, and determining an edge direction with a larger gradient value between the gradient value in the first edge direction and the gradient value in the second edge direction as the strong-edge direction;

in a case where a is less than or equal to T ($\alpha < T$), determining that there is no strong-edge direction.

7. The image processing method according to claim 6, wherein a sum of absolute values of differences between gray-scale values of all two adjacent original pixels in a selected range of an edge direction is taken as a gradient value in the edge direction; in a process of determining a ratio of a larger value to a smaller value between two gradient values, in respective edge directions corresponding to the two gradient values, numbers of original pixels each for calculating a gradient value included in a selected range are equal to each other; and/or the preset ratio threshold value T is in a range of 1.2 to 1.3, inclusive.

8. The image processing method according to claim 1, wherein the at least two edge directions include a first edge direction, a second edge direction and a third edge direction;
determining whether there is the strong-edge direction in the at least two edge directions according to the gradient values in the at least two edge directions, includes:
determining a ratio as of a larger value to a smaller value between a gradient value in the first edge direction and a gradient value in the second edge direction, a ratio $\alpha_4$ of a larger value to a smaller value between the gradient value in the second edge direction and a gradient value in the third edge direction, and a preset ratio threshold value T;
in a case where $\alpha_3$ is greater than $\alpha_4$, and $\alpha_4$ is greater than T ($\alpha_3 > \alpha_4 > T$), determining that there is the strong-edge direction, and determining an edge direction with a larger gradient value between the gradient value in the first edge direction and the gradient value in the second edge direction as the strong-edge direction;
in a case where $\alpha_4$ is greater than $\alpha_3$, and $\alpha_3$ is greater than T ($\alpha_4 > \alpha_3 > T$), determining that there is the strong-edge direction, and determining an edge direction with a larger gradient value between the gradient value in the second edge direction and the gradient value in the third edge direction as the strong-edge direction;
in a case where $\alpha_3$ is less than or equal to T ($\alpha_3 \leq T$), and/or $\alpha_4$ is less than or equal to T ($\alpha_4 \leq T$), determining that there is no strong-edge direction.

9. The image processing method according to claim 8, wherein a sum of absolute values of differences between gray-scale values of all two adjacent original pixels in a selected range of an edge direction is taken as a gradient value in the edge direction; in a process of determining a ratio of a larger value to a smaller value between two gradient values, in respective edge directions corresponding to the two gradient values, numbers of original pixels each for calculating a gradient value included in a selected range are equal to each other; and/or
the preset ratio threshold value T is in a range of 1.2 to 1.3, inclusive.

10. The image processing method according to claim 1, wherein the at least two edge directions include a first edge direction and a second edge direction, and the first edge direction is substantially perpendicular to the second edge direction.

11. The image processing method according to claim 10, wherein the at least two edge directions further include a third edge direction and a fourth edge direction, the third edge direction is substantially perpendicular to the fourth edge direction, and an included angle between the first edge direction and the third edge direction is approximately 45°.

12. The image processing method according to claim 11, wherein the first edge direction is substantially parallel to one of two diagonals of a rectangle determined by the (n×n) neighborhood, the second edge direction is substantially parallel to another one of the two diagonals of the rectangle determined by the (n×n) neighborhood, the third edge direction is substantially parallel to a row direction in which a plurality of pixels in the (n×n) neighborhood are arranged, and the fourth edge direction is substantially parallel to a column direction in which the plurality of pixels in the (n×n) neighborhood are arranged.

13. The image processing method according to claim 1, wherein the preset entropy threshold value is in a range of 0.3 to 0.8, inclusive.

14. The image processing method according to claim 1, wherein the (n×n) neighborhood is a (4×4) neighborhood.

15. The image processing method according to claim 1, wherein the first interpolation algorithm is a bicubic convolution interpolation algorithm, and/or the second interpolation algorithm is a B-spline interpolation algorithm.

16. An electronic device, comprising the processor and the memory, wherein the memory stores computer program instructions adapted to be executed by the processor; when run on the processor, the computer program instructions cause the processor to execute the image processing method according to claim 1.

17. A non-transitory computer-readable storage medium having stored therein computer program instructions that, when run on a computer, cause the computer to execute the image processing method according to claim 1.

18. An image processing method applied to an electrical device, the electronic device includes a processor and a memory, the method comprising:
determining, by the processor, according to position coordinates, in a target image, of any interpolation pixel to be processed of the target image, position coordinates of the interpolation pixel in an original image; the target image being an image after the original image is performed a resolution enhancement, and the interpolation pixel being a pixel generated during the resolution enhancement;
calculating, by the processor, gradient values in at least two edge directions within an (n×n) neighborhood of the interpolation pixel in the original image according to the position coordinate of the interpolation pixel in the original image, n being greater than or equal to 2 (n≥2) and n being a positive integer;
determining, by the processor, whether there is a strong-edge direction in the at least two edge directions according to the gradient values in the at least two edge directions;
if there is the strong-edge direction, calculating, by the processor, a pixel value of the interpolation pixel through a first interpolation algorithm based on a plurality of original pixels in the strong-edge direction within the (n×n) neighborhood;
if there is no strong-edge direction, calculating, by the processor, a two-dimensional image entropy of the (n×n) neighborhood of the interpolation pixel;
in a case where the two-dimensional image entropy is greater than or equal to a preset entropy threshold value, calculating, by the processor, the pixel value of the interpolation pixel through the first interpolation algorithm based on all original pixels within the (n×n) neighborhood;
in a case where the two-dimensional image entropy is less than the preset entropy threshold value, calculating, by the processor, the pixel value of the interpolation pixel through a second interpolation algorithm based on all the original pixels within the (n×n) neighborhood;
mapping, by the processor, the position coordinates of the interpolation pixel in the target image into the original image through a mapping formulas, so as to achieve the resolution enhancement for the original image in any scale.

19. An electronic device, comprising the processor and the memory, wherein the memory stores computer program instructions adapted to be executed by the processor; when run on the processor, the computer program instructions cause the processor to execute the image processing method according to claim 18.

20. A non-transitory computer-readable storage medium having stored therein computer program instructions that, when run on a computer, cause the computer to execute the image processing method according to claim 18.

* * * * *

UNITED STATES PATENT AND TRADEMARK OFFICE
CERTIFICATE OF CORRECTION

PATENT NO. : 12,260,525 B2
APPLICATION NO. : 17/793487
DATED : March 25, 2025
INVENTOR(S) : Xiaolei Liu et al.

Page 1 of 6

It is certified that error appears in the above-identified patent and that said Letters Patent is hereby corrected as shown below:

In the Drawings

Sheet 1, FIG. 1, and on the title page, the illustrative figure, should appear as shown on the attached drawing sheet Sheet 2, FIG. 2 should appear as shown on the attached drawing sheet Sheet 7, FIG. 7 should appear as shown on the attached drawing sheet Sheet 12, FIG. 16 should appear as shown on the attached drawing sheet Sheet 14, FIG. 19 should appear as shown on the attached drawing sheet In the Specification Column 10, Line 47-49, the formula should appear as follows:

$$\begin{aligned}G_{45°} = &\left|I_{(x_1, y_4)} - I_{(x_2, y_3)}\right| + \left|I_{(x_2, y_3)} - I_{(x_3, y_2)}\right| + \left|I_{(x_3, y_2)} - I_{(x_4, y_1)}\right| \\ &+ \left|I_{(x_1, y_3)} - I_{(x_2, y_2)}\right| + \left|I_{(x_2, y_2)} - I_{(x_3, y_1)}\right| \\ &+ \left|I_{(x_2, y_4)} - I_{(x_3, y_3)}\right| + \left|I_{(x_3, y_3)} - I_{(x_4, y_2)}\right|.\end{aligned}$$

Signed and Sealed this
Second Day of September, 2025

Coke Morgan Stewart
*Acting Director of the United States Patent and Trademark Office*